United States Patent
Kaehler et al.

(10) Patent No.: US 10,163,011 B2
(45) Date of Patent: Dec. 25, 2018

(54) ESTIMATING POSE IN 3D SPACE

(71) Applicant: Magic Leap, Inc., Plantation, FL (US)

(72) Inventors: Adrian Kaehler, Los Angeles, CA (US); Gary Bradski, Palo Alto, CA (US)

(73) Assignee: Magic Leap, Inc., Plantation, FL (US)

( * ) Notice: Subject to any disclaimer, the term of this patent is extended or adjusted under 35 U.S.C. 154(b) by 45 days.

(21) Appl. No.: 15/597,694

(22) Filed: May 17, 2017

(65) Prior Publication Data

US 2018/0005034 A1  Jan. 4, 2018

Related U.S. Application Data

(60) Provisional application No. 62/357,285, filed on Jun. 30, 2016.

(51) Int. Cl.
*G06K 9/00* (2006.01)
*G06T 7/11* (2017.01)
*G01S 3/00* (2006.01)
*H04N 5/232* (2006.01)
*H04N 13/344* (2018.01)
*H04N 13/398* (2018.01)

(52) U.S. Cl.
CPC ............ *G06K 9/00671* (2013.01); *G01S 3/00* (2013.01); *G06T 7/11* (2017.01); *H04N 5/232* (2013.01); *H04N 13/344* (2018.05); *H04N 13/398* (2018.05); *H04N 5/23229* (2013.01)

(58) Field of Classification Search
None
See application file for complete search history.

(56) References Cited

U.S. PATENT DOCUMENTS

| 8,950,867 B2 | 2/2015 | Macnamara |
| 9,215,293 B2 | 12/2015 | Miller |
| 9,310,559 B2 | 4/2016 | Macnamara |
| 9,348,143 B2 | 5/2016 | Gao et al. |

(Continued)

FOREIGN PATENT DOCUMENTS

| WO | WO 2015/040119 | 3/2015 |
| WO | WO 2015/090420 | 6/2015 |

OTHER PUBLICATIONS

"Rolling shutter", Wikipedia, accessed Feb. 22, 2016, in 3 pages. URL: https://en.wikipedia.org/wiki/Rolling_shutter.

(Continued)

*Primary Examiner* — Xin Sheng
(74) *Attorney, Agent, or Firm* — Knobbe, Martens, Olson & Bear, LLP

(57) ABSTRACT

Methods and devices for estimating position of a device within a 3D environment are described. Embodiments of the methods include sequentially receiving multiple image segments forming an image representing a field of view (FOV) comprising a portion of the environment. The image includes multiple sparse points that are identifiable based in part on a corresponding subset of image segments of the multiple image segments. The method also includes sequentially identifying one or more sparse points of the multiple sparse points when each subset of image segments corresponding to the one or more sparse points is received and estimating a position of the device in the environment based on the identified the one or more sparse points.

20 Claims, 9 Drawing Sheets

(56) References Cited

U.S. PATENT DOCUMENTS

| | | | |
|---|---|---|---|
| D758,367 S | 6/2016 | Natsume | |
| 9,417,452 B2 | 8/2016 | Schowengerdt et al. | |
| 9,646,384 B2 | 5/2017 | Lee | |
| 2013/0082922 A1 | 4/2013 | Miller | |
| 2013/0125027 A1 | 5/2013 | Abovitz | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0306866 A1 | 10/2014 | Miller et al. | |
| 2014/0323148 A1* | 10/2014 | Schmalstieg | G01C 21/005 455/456.1 |
| 2015/0016777 A1 | 1/2015 | Abovitz et al. | |
| 2015/0103306 A1 | 4/2015 | Kaji et al. | |
| 2015/0178939 A1* | 6/2015 | Bradski | G02B 27/017 345/633 |
| 2015/0193971 A1 | 7/2015 | Dryanovski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0310665 A1 | 10/2015 | Michail et al. | |
| 2015/0346490 A1 | 12/2015 | Tekolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0035139 A1 | 2/2016 | Fuchs et al. | |
| 2016/0073117 A1* | 3/2016 | Grasmug | G06T 9/001 375/240.26 |
| 2016/0210761 A1* | 7/2016 | Pollefeys | G06T 15/205 |
| 2016/0232678 A1* | 8/2016 | Kurz | G06F 17/30247 |

OTHER PUBLICATIONS

"Simultaneous localization and mapping", Wikipedia, accessed Feb. 22, 2016, in 7 pages. URL: https://en.wikipedia.org/wiki/Simultaneous_localization_and_mapping.

Karlsson, N. et al., "The vSLAM Algorithm for Robust Localization and Mapping", Proc. of Int. Conf. on Robotics and Automation (IRCA), Jan. 2005, in 6 pages.

International Search Report and Written Opinion for PCT Application No. PCT/US2017/033139, 14 pages, dated Aug. 7, 2017.

* cited by examiner

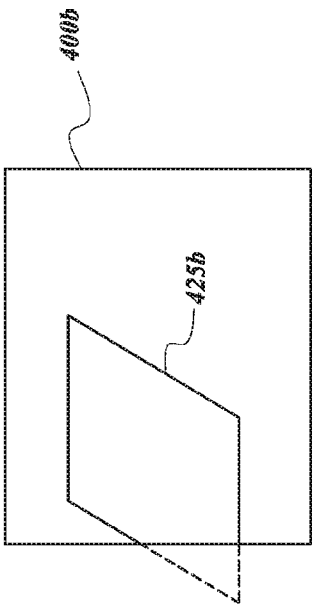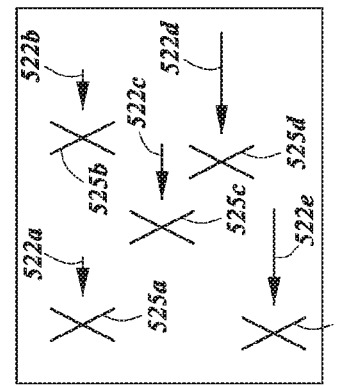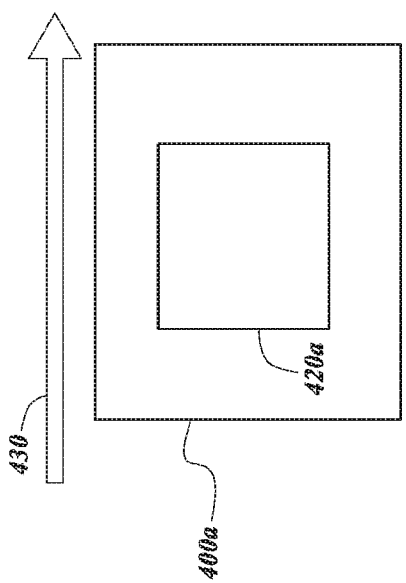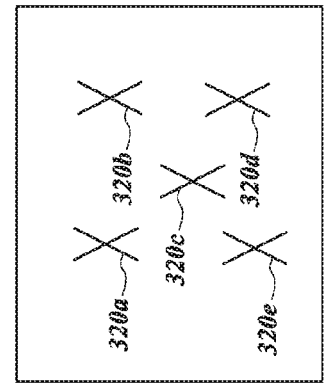

ESTIMATING POSE IN 3D SPACE

CROSS-REFERENCE TO RELATED APPLICATIONS

This application claims the benefit of priority under 35 U.S.C. § 119(e) to U.S. Provisional Patent Application No. 62/357,285 filed Jun. 30, 2016, entitled "ESTIMATING POSE IN 3D SPACE," the contents of which are hereby incorporated by reference herein in their entirety.

FIELD

The present disclosure relates to virtual reality and augmented reality imaging and visualization systems and more particularly to sparse pose estimation in three-dimensional (3D) space.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene 1000 is depicted wherein a user of an AR technology sees a real-world park-like setting 1100 featuring people, trees, buildings in the background, and a concrete platform 1120. In addition to these items, the user of the AR technology also perceives that he "sees" a robot statue 1110 standing upon the real-world platform 1120, and a cartoon-like avatar character 1130 flying by which seems to be a personification of a bumble bee, even though these elements do not exist in the real world. As it turns out, the human visual perception system is very complex, and producing a VR or AR technology that facilitates a comfortable, natural-feeling, rich presentation of virtual image elements amongst other virtual or real-world imagery elements is challenging. Systems and methods disclosed herein address various challenges related to VR and AR technology.

SUMMARY

One aspect of the present disclosure provides sparse pose estimation performed as sparse points are captured in an image frame by an image capture device. Accordingly, the sparse pose estimation can be performed before the entire image frame has been captured. In some embodiments, the sparse pose estimation may be refined or updated as the image frame is captured.

In some embodiments, systems, devices, and methods for estimating a position of an image capture device within an environment are disclosed. In some implementations, the method may include sequentially receiving a first group of multiple image segments. The first group of multiple image segments may form at least a portion of an image representing a field of view (FOV) from in front of an image capture device, which may include a portion of the environment surrounding the image capture device and multiple sparse points. Each sparse point may correspond to a subset of image segments. The method may also include identifying a first group of sparse points, which includes one or more sparse points that are identified as the first group of multiple image segments are received. The method may then include determining, by a position estimation system, the position of the image capture device within the environment based on the first group of sparse points. The method may also include sequentially receiving a second group of multiple image segments, which may be received after the first group of multiple image segments and form at least another portion of the image. The method may then include identifying a second group of sparse points, which may include one or more sparse points that are identified as the second group of multiple image segments are received. The method may then update, by the position estimation system, the position of the image capture device within the environment based on the first and second group of sparse points.

In some embodiments, systems, devices, and methods for estimating a position of an image capture device within an environment are disclosed. In some implementations, a method may include sequentially receiving multiple image segments, which may form an image representing a field of view (FOV) from in front of the image capture device. The FOV may include a portion of the environment surrounding the image capture device and include multiple sparse points. Each sparse point may be identifiable based in part on a corresponding subset of image segments of the multiple image segments. The method may also include sequentially identifying one or more sparse points of the multiple sparse points when each subset of image segments corresponding to the one or more sparse points is received. The method may then include estimating a position of the image capture device in the environment based on the identified the one or more sparse points.

In some embodiments, systems, devices, and methods for estimating a position of an image capture device within an environment are disclosed. In some implementations, an image capture device may include an image sensor configured to capture an image. The image may be captured via sequentially capturing multiple image segments that represent a field of view (FOV) of the image capture device. The FOV may include a portion of the environment surrounding the image capture device and a plurality of sparse points. Each sparse point may be identifiable based in part on a corresponding subset of the multiple image segments. The image capture device may also include a memory circuit configured to store the subsets of image segments corresponding to one or more sparse points and a computer processor operatively coupled to the memory circuit. The computer processor may be configured to sequentially identify one or more sparse points of the multiple sparse points when each subset of image segments corresponding to the one or more sparse points is received by the image capture device. The computer processor may also be configured to extract the sequentially identified one or more sparse points for estimating a position of the image capture device in the environment based on the identified the one or more sparse points.

In some embodiments, systems, devices, and methods for estimating a position of an image capture device within an environment are disclosed. In some implementations, an augmented reality system is disclosed. The augmented reality system may include an outward-facing imaging device, computer hardware, and a processor operatively coupled to the computer hardware and outward-facing imaging device. The processor may be configured to execute instructions to perform at least a portion of the methods disclosed herein.

In some embodiments, systems, devices, and methods for estimating a position of an image capture device within an environment are disclosed. In some implementations, an autonomous entity is disclosed. The autonomous entity may include an outward-facing imaging device, computer hardware, and a processor operatively coupled to the computer hardware and outward-facing imaging device. The processor may be configured to execute instructions to perform at least a portion of the methods disclosed herein.

In some embodiments, systems, devices, and methods for estimating a position of an image capture device within an environment are disclosed. In some implementations, a robotic system is disclosed. The robotic system may include an outward-facing imaging device, computer hardware, and a processor operatively coupled to the computer hardware and outward-facing imaging device. The processor may be configured to execute instructions to perform at least a portion of the methods disclosed herein.

Various implementations of methods and apparatus within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 4A and 4B schematically illustrate an example of a shearing effect on an image frame.

FIGS. 5A and 5B schematically illustrate an example of the shearing effect of FIGS. 4A and 4B on multiple sparse points.

Figure 1:
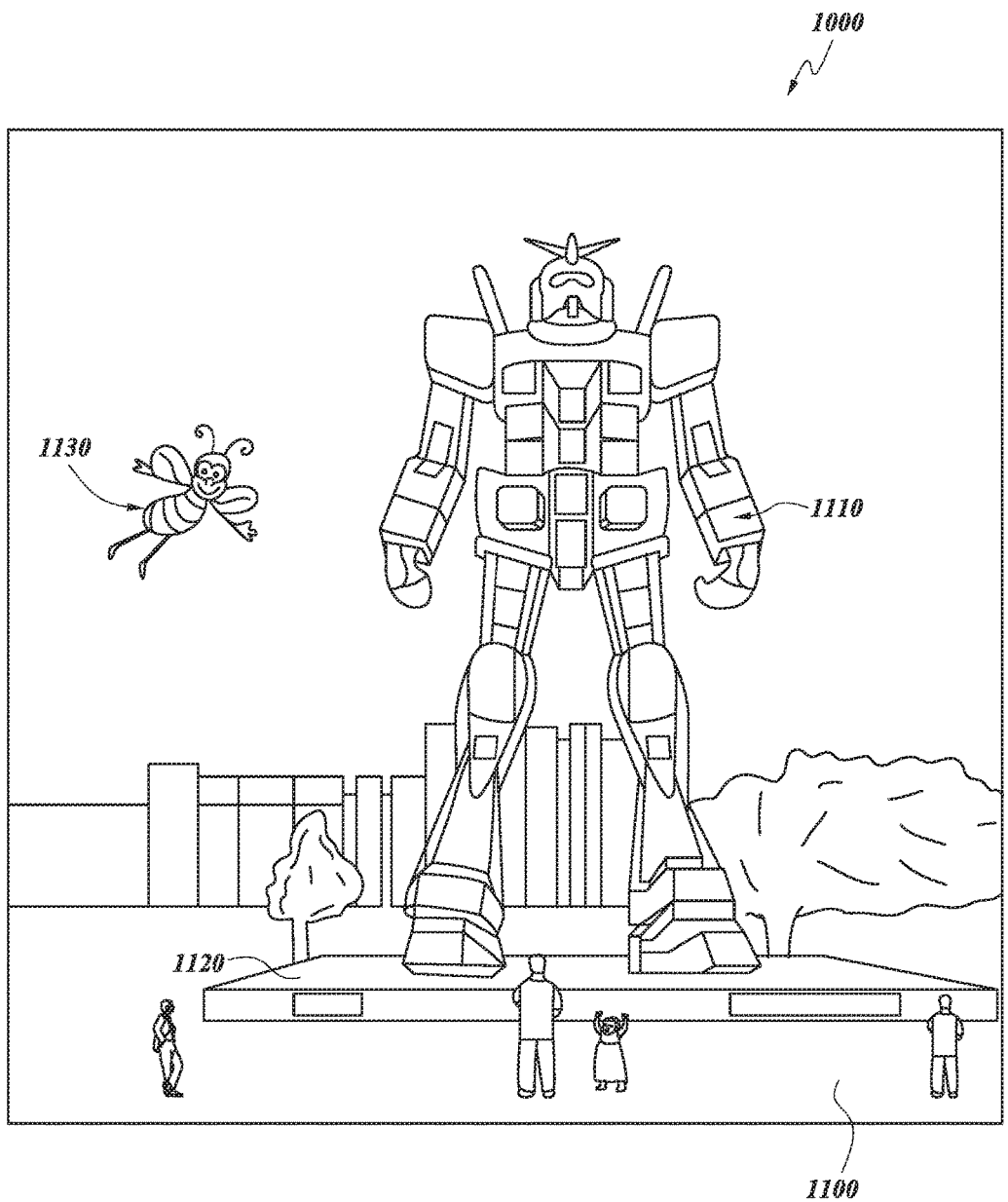
FIG. 1 depicts an illustration of an augmented reality scenario with certain virtual reality objects, and certain actual reality objects viewed by a person.

Throughout the drawings, reference numbers may be re-used to indicate correspondence between referenced elements. The drawings provided are not to scale and are provided to illustrate example embodiments described herein and are not intended to limit the scope of the disclosure.

DETAILED DESCRIPTION

Overview

With the use of the AR devices, or other devices that move within a three dimensional (3D) space, the device may need to track its movement through the 3D space and map the 3D space. For example, the AR device may be moved about the 3D space, either due to movement of a user or independent of a user (e.g., a robot or other autonomous entity), and, to facilitate display of virtual image elements among other virtual image elements or real-world image elements, it may be beneficial to map the 3D space and determine one or more of the location, position, or orientation of the device within the 3D space for subsequent processing. For example, to accurately present the virtual and real-world image elements, the device may need to know where it is located and at what orientation within the real-world and accurately render a virtual image in a particular location with a particular orientation within the real-world space. In another embodiment, it may be desirable to reproduce to the trajectory of the device through the 3D space. Thus, it may be desirable to determine, in real-time as the device moves about the 3D space, a position, location, or orientation (hereinafter referred to collectively as a "pose") of the device within the 3D space. In some implementations, sparse pose estimation within the 3D space may be determined from a continuous stream of image frames from an imaging device included as part of, for example, the AR device. Each image frame of the continuous stream may be stored for processing, and also to estimate the pose of the device therefrom for inclusion in the sparse pose estimation. However, these techniques may cause delays in estimating pose due to transferring the entirety of each frame to a memory for subsequent processing.

The present disclosure provides example devices and methods configured to estimate a pose of a device (e.g., an AR device or an autonomous device such as a robot) within a 3D space. As one example, the device may perform sparse pose estimation based on receiving multiple image frames and estimating the pose of the device from each image frame as the device moves through the 3D space. Each image frame may represent a portion of the 3D space in front of the device indicative of a position of the device within the 3D space. In some embodiments, each image frame may include one or more of features or objects that may be represented by sparse points, keypoints, point clouds, or other types of mathematical representations. For each image frame, an image frame may be captured by sequentially receiving multiple image segments that, when combined, make up the entire image frame. Therefrom, the device may be configured to identify the sparse points within the image frame upon receiving the image segments comprising each sparse point. The device may extract a first group of sparse points, comprising one or more sparse points. The first group of sparse points may be at least one input to a sparse pose estimation process. Subsequently, the device may identify and extract a second group of sparse points and update the sparse pose estimation based on the second group. In one example implementation, the first group of sparse points may be utilized to estimate the pose of the device prior to identifying subsequent sparse points (e.g., the second group of sparse points). Subsequent sparse points may become available for use in updating the sparse pose estimation as they are identified.

While embodiments of the methods, devices, and systems are described herein with reference to an AR device, this is not intended to limit the scope of the disclosure. The methods and devices described herein are not limited to an AR device or a head mounted device; other devices are possible (for example, mobile robotics, a digital camera, autonomous entities, etc.). Applicable devices include, but are not limited to, such device capable of moving, independently or by user intervention, through a 3D space. For example, the methods described herein may be applied to an object moved about a 3D space that is tracked by cameras that are remote to the object. In some embodiments, the processing may also be performed remote to the object.

Example AR Device for Moving in a 3D Space

In order for a 3D display to facilitate a comfortable, natural-feeling, rich presentation of virtual image elements among other virtual or real-world imagery elements, it is desirable to map the real-world surrounding the display and to reproduce the trajectory of the display through the 3D space. For example, a sparse pose estimation process may be performed to determine the map of the 3D space. If the sparse pose estimation is not performed in real-time with minimal delay, the user may experience unstable imaging, harmful eyestrain, headaches, and generally unpleased VR and AR viewing experience. Accordingly, various embodiments described herein are configured to determine or estimate one or more of the position, location, or orientation of an AR device.

Figure 2:
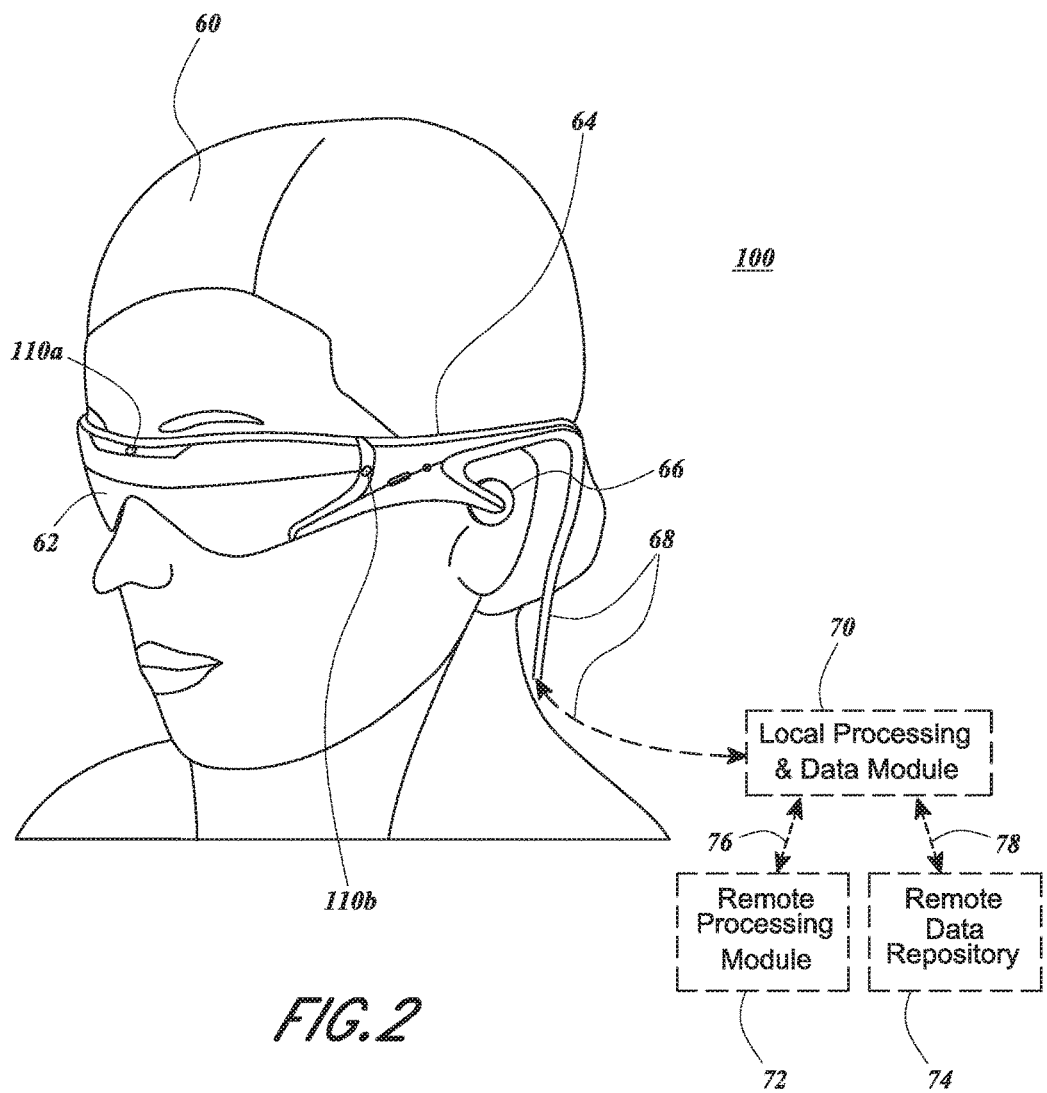
FIG. 2 schematically illustrates an example of a wearable display system.

FIG. 2 illustrates an example of wearable display system 100. The display system 100 includes a display 62, and various mechanical and electronic modules and systems to support the functioning of display 62. The display 62 may be coupled to a frame 64, which is wearable by a display system user, wearer, or viewer 60 and which is configured to position the display 62 in front of the eyes of the viewer 60. The display system 100 can comprise a head mounted display (HMD) that is worn on the head of the wearer. An augmented reality display (ARD) can include the wearable display system 100. In some embodiments, a speaker 66 is coupled to the frame 64 and positioned adjacent the ear canal of the user (in some embodiments, another speaker, not shown, may be positioned adjacent the other ear canal of the user to provide for stereo/shapeable sound control). The display system 100 can include one or more outward-facing imaging systems 110 that observe the world in the environment (e.g., a 3D space) around the wearer. The display 62 can be operatively coupled by a communications link 68, such as by a wired lead or wireless connectivity, to a local processing and data module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration).

The display system 100 may comprise one or more outward-facing imaging systems 110a or 110b (individually or collectively referred to hereinafter as "110") disposed on the frame 64. In some embodiments, the outward-facing imaging system 110a can be disposed at approximately a central portion of the frame 64 between the eyes of the user. In another embodiment, alternatively or in combination, the outward-facing imaging system 110b can be disposed on one or more sides of the frame adjacent to one or both eyes of the user. For example, an outward-facing imaging system 110b may be located on both the left and right side of the user adjacent to both eyes. While example arrangements of the outward-facing camera 110 are provided above, other configurations are possible. For example, the outward facing imaging system 110 may be positioned in any orientation or position relative to the display system 100.

In some embodiments, the outward-facing imaging system 110 captures an image of a portion of the world in front of the display system 100. The entire region available for viewing or imaging by a viewer may be referred to as the field of regard (FOR). In some implementations, the FOR may include substantially all of the solid angle around the display system 100 because the display may be moved about the environment to image objects surrounding the display (in front, in back, above, below, or on the sides of the wearer). The portion of the FOR in front of the display system may be referred to as the field of view (FOV) and the outward-facing imaging system 110 is sometimes referred to as an FOV camera. Images obtained from the outward-facing imaging system 110 can be used to identify sparse points of the environment and estimate the pose for use in a sparse pose estimation process, and so forth.

In some implementations, the outward-facing imaging system 110 may be configured as a digital camera comprising an optical lens system and an image sensor. For example, light from the world in front of the display 62 (e.g., from the FOV) may be focused by the lens of the outward-facing imaging system 110 onto the image sensor. In some embodiments, the outward-facing imaging system 100 may be configured to operate in the infrared (IR) spectrum, visible light spectrum, or in any other suitable wavelength range or range of wavelengths of electromagnetic radiation. In some embodiments, the imaging sensor may be configured as either a CMOS (complementary metal-oxide semiconductor) or CCD (charged-coupled device) sensor. In some embodiments, the image sensor may be configured to detect light in the IR spectrum, visible light spectrum, or in any other suitable wavelength range or range of wavelengths of electromagnetic radiation. In some embodiments, the frame rate of the digital camera may relate to a rate that image data can be transmitted from the digital camera to the memory or storage unit (e.g., local processing and data module 70). For example, if the frame rate of the digital camera is 30 hertz, then data captured by the pixels of the image sensor may be read into the memory (e.g., clocked off) every 30 milliseconds. Thus, the frame rate of the digital camera may impart a delay into the storing and subsequent processing of image data.

In some embodiments, where the outward-facing imaging system 110 is a digital camera, the outward-facing imaging system 110 may be configured as a global shutter camera or a rolling shutter (e.g., also referred to as a progressive scan camera). For example, where the outward-facing imaging system 110 is a global shutter camera, the image sensor may be a CCD sensor configured to capture an entire image frame representative of the FOV in front of the display 62 in a single operation. The entire image frame may then be read into the local processing and data module 70 for processing, for example, performing sparse pose estimation as described herein. Accordingly, in some embodiments, utilizing the entire image frame may impart a delay into the pose estimation, for example, due to the frame rate and delay in storing the image, as described above. For example, a global shutter digital camera having a 30 hertz frame rate may impart a 30 millisecond delay before any pose estimation can be performed.

In other embodiments, where the outward-facing imaging system 110 is configured as rolling shutter camera, the image sensor may be a CMOS sensor configured to sequentially capture a plurality image segments and scan across the scene to transmit image data of the captured image segments. The image segments, when combined in the order captured, make up the image frame of the FOV of the outward facing imaging system 110. In some embodiments, the scan direction may be horizontal, for example, the outward-facing imaging system 110 may capture a plurality of vertical image segments that are horizontally adjacent in a leftward or rightward direction. In another embodiment, the scan direction may be vertical, for example, the outward-facing imaging system 110 may capture a plurality of horizontal image segments that are vertically adjacent in an upward or downward direction. Each image segment may be sequentially read into the local processing and data module 70 as the respective image segment is captured at the image sensor. Accordingly, in some embodiments, the delay due to the frame rate of a digital camera, as described above, may be reduced or minimized by sequentially transmitting the image segments as they are captured by the digital camera.

The local processing and data module 70 may comprise one or more hardware processors, as well as digital memory, such as non-volatile memory (e.g., flash memory), both of which may be utilized to assist in the processing, buffering, caching, and storage of data. The data may include data a) captured from sensors (which may be, e.g., operatively coupled to the frame 64 or otherwise attached to the user 60), such as image capture devices (e.g., outward-facing imaging system 110), microphones, inertial measurement units (IMUs), accelerometers, compasses, global positioning system (GPS) units, radio devices, and/or gyroscopes; and/or b) acquired and/or processed using remote processing module 72 and/or remote data repository 74, possibly for passage to the display 62 after such processing or retrieval. The local processing and data module 70 may be operatively coupled by communication links 76 and/or 78, such as via wired or wireless communication links, to the remote processing module 72 and/or remote data repository 74 such that these remote modules are available as resources to the local processing and data module 71. In addition, remote processing module 72 and remote data repository 74 may be operatively coupled to each other. In some embodiments, the local processing and data module 70 may be operably connected to one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

In some embodiments, the digital memory of local processing and data module 70 or a portion thereof may be configured to store one or more elements of data for a temporary period of time (e.g., as a non-transitory buffer storage). For example, the digital memory may be configured to receive some or all of the data and store some or all of the data for a short-term period of time while the data is moved between processes of the local processing and data module 70. In some implementations, a portion of the digital memory may be configured as a buffer that sequentially receives one or more image segments from the outward-facing imaging system 110. Accordingly, the buffer may be a non-transitory data buffer configured to store a set number of image segments (as described below with reference to FIGS. 9A and 9B) prior to the image segments being transmitted to the local processing and data module 70 (or remove data repository 74) for permanent storage or subsequent processing.

In some embodiments, the remote processing module 72 may comprise one or more hardware processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module 70, allowing fully autonomous use from a remote module.

While an example AR device is described herein, it will be understood that the methods and devices disclosed herein are not limited to AR devices or head mounted devices. Other configurations are possible, for example, mobile robotics, a digital camera, autonomous entities, etc. Applicable devices include, but are not limited to, such devices capable of moving, independently or by use intervention, through a 3D space.

Example Trajectory of AR Device Through a 3D Space

Figure 3:
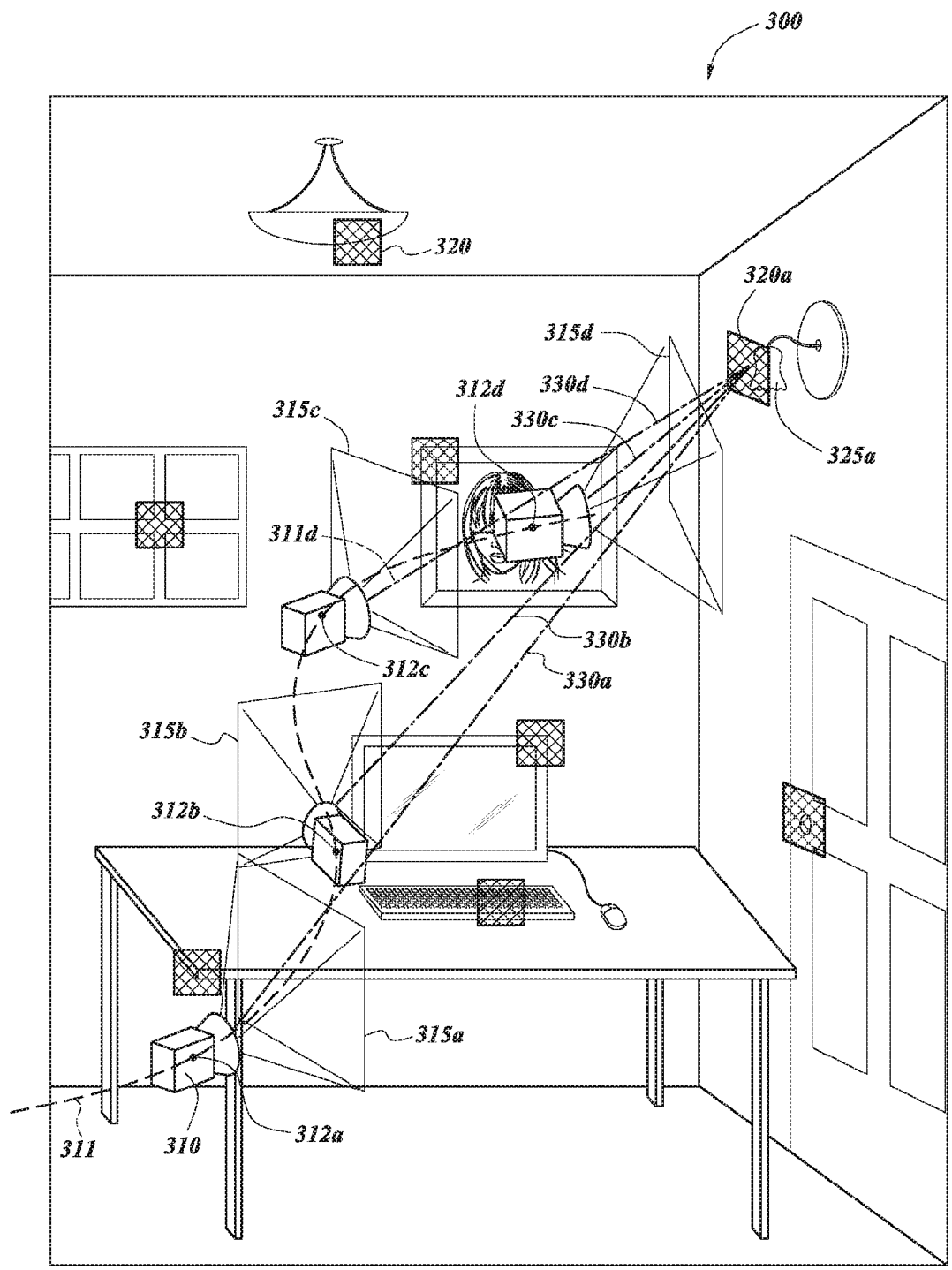
FIG. 3 schematically illustrates an example of a plurality of positions of an imaging device as it moves in a 3D space (a room in this example).

FIG. 3 schematically illustrates an imaging device 310 as it moves through a 3D space 300. For example, FIG. 3 shows the imaging device 310 at multiple positions 312 (e.g., 312a, 312b, 312c, and 312d) and orientations within environment 300 as the imaging device 310 moves along the dotted line that schematically represents a trajectory 311. At each position 312, the imaging device 310 may be configured to capture an image frame of the environment 300 of a particular location and orientation, which may be used as a continuous stream of image frames, for example, for performing sparse pose estimation. The trajectory 311 may be any trajectory or path of movement through the environment 300. While FIG. 3 illustrates four positions 312, the number of positions can be different. For example, the number of positions 312 may be as few as two positions or as many as desired to perform the sparse pose estimation with an acceptable level of certainty (e.g., 5, 6, 7, etc.). In some embodiments, the imaging device 312 may be configured to capture a series of image frames, for example, as in a video, where each image frame of the video may be utilized to perform sparse pose estimation via computer vision techniques as described herein.

In some embodiments, the imaging device 310 may be configured as a display system 100 of FIG. 1, comprising an outward-facing imaging system 110, a mobile robot including an imaging system, or as an independent imaging device. The imaging device 310 may be configured to capture image frames at each position 312 depicting a portion of the environment 300 from in front of the imaging device 310 as its moves through the environment 300. As described above, the portion of the environment 300 captured by the imaging device at each position 312 and orientation may be the FOV from in front of the imaging device 310. For example, the FOV of the position 312a is schematically illustrated as FOV 315a. Each subsequent position and orientation (e.g., 312b, 312c, and 312d) of imaging device 310 comprises a corresponding FOV 315 (e.g., FOV 315b, 315c, and 315d). Computer vision techniques may be performed on each image frame obtained from the imaging device 310 to estimate a pose of the imaging device 310 at each position 312. The pose estimation may be an input to a sparse point estimation process employed to, for example, determine or generate a map (or portions thereof) of the environment 300 and track the movement of the imaging device 310 through the environment 300.

The environment 300 may be any 3D space, for example, an office room (as illustrated in FIG. 3), a living room, an outdoor space, etc. The environment 300 may comprise a plurality of objects 325 (e.g., furniture, personal items, surrounding structures, textures, detectable patterns, etc.) disposed throughout the environment 300. The objects 325 may be individual objects that are uniquely identifiable as compared to other features in the environment (e.g., each wall may not be uniquely identifiable). Furthermore, the objects 325 may be common features captured in two or more image frames. For example, FIG. 3 illustrates an object 325a (a lamp in this example) located in each of the FOV 315 of the imaging device 310 at each position 312 along a corresponding line of sight 330a-d (shown, for illustrative purposes, as a dotted line). Thus, for each position 312 (e.g., 312a) the image frame representative of each FOV 315 (e.g., 315a) includes the object 325a as imaged along line of sight 330 (e.g., 330a).

The imaging device 310 may be configured to detect and extract a plurality of sparse points 320, each sparse point 320 (or multiple sparse points) corresponding to an object 325 or portion, texture, or pattern of the object 325, from each image frame representing an FOV 315. For example, the imaging device 310 may extract a sparse point 320a corresponding to object 325a. In some embodiments, the object 325a may be associated with one or more sparse points 320, where each sparse point 320 may be associated with a different portion of object 325 (e.g., a corner, top, bottom, side, etc. of the lamp). Accordingly, each sparse point 320 may be uniquely identifiable within the image frame. Computer vision techniques can be used to extract and identify each sparse point 320 from the image frame or image segments corresponding to each sparse point 320 (e.g., as described in connection to FIGS. 9A and 9B).

In some embodiments, the sparse points 320 may be utilized to estimate the position, location, or orientation of the imaging device 310 within the environment 300. For example, the imaging device 310 may be configured to extract a plurality of sparse points 320 as inputs into to a sparse pose estimation process. An example computer vision technique used for sparse pose estimation may be a simultaneous localization and mapping (SLAM or V-SLAM, referring to a configuration wherein the input is images/visual only) process or algorithm. Such example computer vision techniques can be used to output a sparse point representation of the world surrounding the imaging device 310, as described in more detail below. In a conventional sparse pose estimation system using the multiple image frames of positions 312, sparse points 320 may be collected from each image frame, correspondences are computed between successive image frames (e.g., position 312a to 312b), and pose changes are estimated based on the correspondences discovered. Accordingly, in some embodiments, the position, orientation, or both position and orientation of the imaging device 310 can be determined. In some implementations, a 3D map of the locations of the sparse points may be required for the estimation process or may be a byproduct of identifying sparse points in an image frame or multiple image frames. In some embodiments, the sparse points 320 may be associated with one or more descriptors, which may be configured as digital representations of the sparse points 320. In some embodiments, the descriptors may be configured to facilitate the computation of correspondence between the successive image frames. In some embodiments, the pose determination may be performed by a processor on board the imaging device (e.g., local processing and data module 70) or remote to the imaging device (e.g., remote processing module 72).

In some embodiments, a computer vision module can be included in operable communication with the imaging device 310, for example, as part of the local processing and data module 70 or the remote processing module and data repository 72, 74. Example computer vision modules can implement one or more computer vision techniques and can be used to analyze the image segments obtained by the outward facing imaging cameras, e.g., to identify sparse points, determine pose, etc., for example as described with reference to the methods 800, 1000 of FIGS. 8 and 10. The computer vision module can identify objects in the environment surrounding the imaging device 310, such as those described in connection to FIG. 3. The computer vision module can extract sparse points from an image frame and use the extracted sparse points for tracking and identifying the object through various image frames as the imaging device moves in the environment. For example, sparse points of a first image frame may be compared to sparse points of a second image frame to track the movement the imaging device. In some embodiments, one or more sparse points of the second image frame may include one or more of the sparse points of the first image frame, for example, as a reference point for tracking between the first and second image frames. Third, fourth, fifth, etc. image frames may be similarly used and compared to previous and subsequent image frames. The computer vision module can process the sparse points to estimate the position or orientation of the imaging device within the environment based on the identified sparse points. Non-limiting examples of computer vision techniques include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (v-SLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

As described above, current pose estimation processes may include a delay in estimating the pose of an imaging device. For example, the frame rate of the imaging device may cause a delay, in part, due to transferring the entire image frame from the imaging device to the memory. Without subscribing to any particular scientific theory, the sparse pose estimation may be delayed because sparse points are not extracted from the image frame until the entire image frame is read to the memory from the imaging device. Accordingly, the transfer of the entire image frame based in part on the frame rate capabilities of the imaging device may be one component of the delay experienced in sparse pose estimation. One non-limiting advantage of some of the systems and devices described herein is that extraction or identification of sparse points for estimating pose may be performed on the fly as portions of the image frame are read into the image sensor or memory, thus pose may be estimated at a point in time earlier than otherwise possible when using the entire image frame. Further, since only a portion of a frame may be analyzed for keypoints, processing speed and efficiency may be increased.

While the foregoing description describes sparse points 320 in the context of physical objects in the environment 300, this is not intended to be limiting and other implementations are possible. In some embodiments, the objects 325 may refer to any feature of the environment (e.g., real-world objects, virtual objects, non-visible objects or features, etc.). For example, a projecting device may be configured to project a plurality of indicators, textures, identifiers, etc. throughout the environment that may be visible or non-visible (e.g., projected in the IR spectrum, near-IR spectrum, ultraviolet spectrum, or in any other suitable wavelength range or range of wavelengths of electromagnetic radiation). The indicators, textures, identifiers, etc., may be a distinctive feature or shape that is detectable by the imaging device 310. The imaging device 310 may be configured to detect these indicators and extract sparse points 320 from the plurality of indicators. For example, an indicator may be projected on the wall of the environment in the IR spectrum of electromagnetic radiation and the imaging device 310 may be configured to operate in the IR spectrum to identify indicator and extract sparse points therefrom. In another embodiment, in the alternative or in combination, the imaging device 310 may be included in an AR device that is configured to display a virtual image element (e.g., on display 62). The imaging device or the AR device may be configured to identify the virtual image element and extract sparse points 320 therefrom. The AR device may be configured use these sparse points 320 to determine pose of the AR device relative to the virtual image elements.

Example of Shear Effect Imparted into an Example Image Frame and Sparse Points

As described above, outward-facing imaging system 110 may be implemented as a rolling shutter camera. One non-limiting advantage of a rolling shutter camera is the ability to transmit portions of the captured scene (e.g., image segments) while capturing other portions (e.g., not all portions of the image frame are captured at exactly the same time). However, this may result in distortions of objects that are moving relative to the camera while the image frame is captured because the imaging device may not be in the same position relative to the object for the entire time of capturing the image.

For example, FIGS. 4A and 4B are schematic illustrations of a rolling shutter effect (e.g., sometimes referred to herein as "shearing," "shifting," or "distortion") applied to an image of a scene. FIG. 4A schematically illustrates a scene 400a comprising an object 425a (e.g., a square in this example). The scene may be the FOV of an image capture device (e.g., outward-facing imaging system 110 of FIG. 2). In the embodiment illustrated in FIG. 4A, the scene may be moving relative to the image capture device in a direction 430. FIG. 4B illustrates the resulting image 400b of the captured scene 400a that may be stored in a memory or storage unit (e.g., local processing and data module 70). As illustrated in FIG. 4B, due to the relative movement of the object 425a, the resulting image 400b is a distorted object 425b (e.g., shown as a sheared square or a rhombus), where the dotted lines of the distorted object are not captured in the resulting image 400b. Without subscribing to any particular scientific theory, this may be due to a progressive downward scan direction of the imaging device, thus the top of the object is captured first and is less distorted than the bottom of the object.

FIGS. 5A and 5B are schematic illustrations of the rolling shutter effect imparted onto a plurality of sparse points included in a FOV captured by an imaging device (e.g., FOV 315a, 315b, 315c, or 315d of FIG. 3). For example, as an AR device moves about the 3D space, the various sparse points move relative to the AR device and are distorted as schematically illustrated in FIG. 5B in a manner similar to that described above in connection with FIG. 4B. FIG. 5A illustrates a scene (e.g., which may be similar to scene 300 of FIG. 3) comprising a plurality of sparse points 320 (e.g., 320a, 320b, and 320c). FIG. 4B schematically illustrates the resulting captured image frame comprises distorted sparse points 525 (e.g., 525a, 525b, and 525c). For example, each distorted sparse point 525 is associated with an illustrative corresponding arrow 522. For illustrative purposes only, the size of the arrows 522 is proportional to the amount of distortion imparted to the sparse points 525. Accordingly, similar to that described above in connection with FIG. 4B, the arrow 522a is smaller than arrow 522e, which may be indicative that the sparse point 525a, associated with the arrow 522a is distorted less severely as compared to sparse point 525e.

Example AR Architecture

Figure 6:
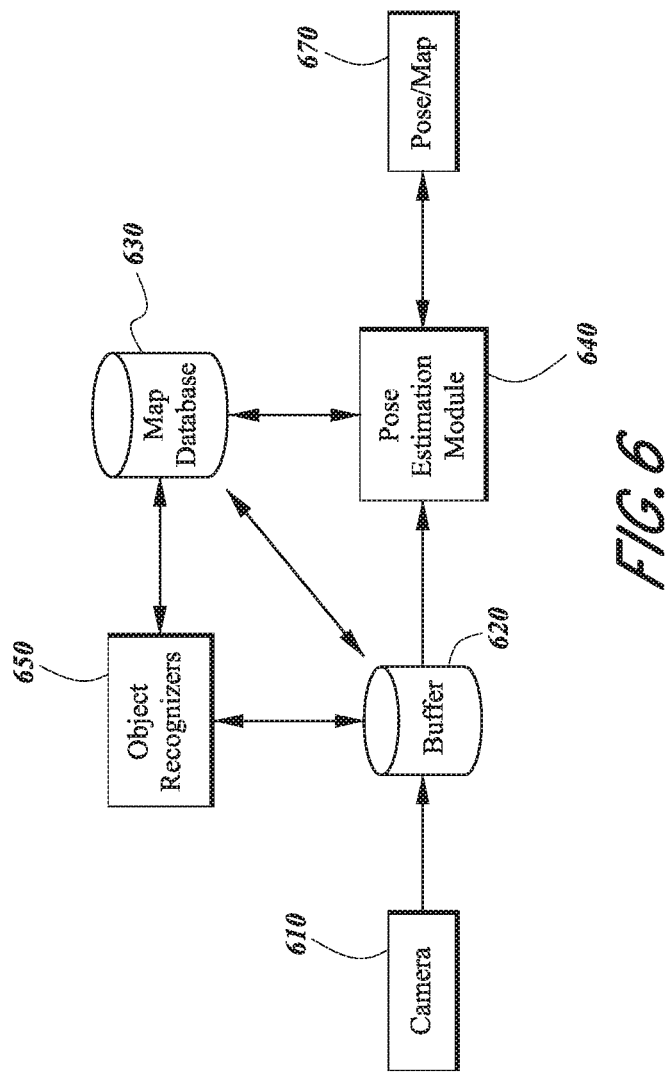
FIG. 6 is a block diagram of an example AR architecture.

FIG. 6 is a block diagram of an example of an AR architecture 600. The AR architecture 600 is configured to receive input (e.g., a visual input from outward-facing imaging system 110, input from room cameras, etc.) from one or more imaging systems. The imaging devices not only provide images from FOV cameras, they may also be equipped with various sensors (e.g., accelerometers, gyroscopes, temperature sensors, movement sensors, depth sensors, GPS sensors, etc.) to determine the location and various other attributes of the environment of the user. This information may further be supplemented with information from stationary cameras in the room that may provide images and/or various cues from a different point of view.

The AR architecture 600 may comprise multiple cameras 610. For example, the AR architecture 600 may include outward-facing imaging system 110 of FIG. 1 configured to input a plurality of images captured of the FOV from in front the wearable display system 100. In some embodiments the cameras 610 may include a relative wide field of view or passive pair of cameras arranged to the sides of the user's face and a different pair of cameras oriented in front of the user to handle a stereo imaging process. However, other imaging systems, cameras, and arrangements are possible.

The AR architecture 600 may also comprise a map database 630 including map data for the world. In one embodiment, the map database 630 may partly reside on a user-wearable system (e.g., the local processing and data module 70), or may partly reside at networked storage locations accessibly by wired or wireless network (e.g., remote data repository 74). In some embodiments, the map database 630 may comprise real-world map data or virtual map data (e.g., including virtual image elements defining a virtual map or overlaid on a real-world environment). In some embodiments, computer vision techniques can be used to produce map data. In some embodiments, the map database 630 may be a preexisting map of the environment. In other embodiments, the map database 630 may be populated based on identified sparse points read into the memory and stored for comparison and processing relative to subsequently identified sparse points. In another embodiment, alone or in combination, the map database 630 may be a preexisting map that is dynamically updated based on identified sparse points from one or more image frames (or portions of the frames for a rolling shutter camera system). For example, one or more sparse points may be used to identify objects (e.g., objects 325 of FIG. 3) in the environment and used to populate the map with identifying features of the environment.

The AR architecture 600 may also comprise a buffer 620 configured to receive inputs from cameras 610. The buffer 620 may be a non-transitory data buffer, for example, that is separate from or a portion of a non-transitory data storage (e.g., local processing and data module 70 of FIG. 2) and configured to store image data on a temporary basis. The buffer 620 may then store some or all received inputs temporarily. In some embodiments, the buffer 620 may be configured to store one or more portions or segments of received data before, for example, further processing is performed and the data is moved to another component of the AR architecture 600 (e.g., as described below in connection with FIGS. 9A and 9B). In some embodiments, image data collected by the camera 610 may be read into the buffer 620 as a user experiences a wearable display system 100 operating in the environment. Such image data may comprise images, or segments of images, captured by cameras 610. Image data representative of the images or segments of images may then be transmitted to and stored in the buffer 620 before being processed by the local processing and data module and sent to the display 62 for visualization and representation to the user of the wearable display system 100. The image data may also, alternatively or in combination, be stored in the map database 630. Or, the data may be removed from the memory (e.g., local processing and data module 70 or remote data repository 74) after stored in the buffer 620. In one embodiment, the buffer 620 may partly reside on a user-wearable system (e.g., the local processing and data module 70), or may partly reside at networked storage locations accessibly by wired or wireless network (e.g., remote data repository 74).

The AR architecture 600 may also include one or more object recognizers 650. Object recognizers may be configured to crawl through the received data and identify and/or tag objects, and attach information to the objects with the help of a map database 630, for example, via computer vision techniques. For example, the object recognizers may scan or crawl through the image data or image segments stored in the buffer 620 and identify objects captured in the image data (e.g., objects 325 of FIG. 3). The objects identified in the buffer may be tagged or description information attached thereto with reference to the map database. The map database 630 may comprise various objects identified over time and between the captured image data and their corresponding objects (e.g., a comparison of objects identified in a first image frame with an object identified in a subsequent image frame) to generate the map database 630 or used to generate a map of the environment. In some embodiments, the map database 630 may be populated with a preexisting map of the environment. In some embodiments, the map database 630 is stored on board the AR device (e.g., local processing and data module 70). In other embodiments, the AR device and the map database can be connected to each other through a network (e.g., LAN, WAN, etc.) to access a cloud storage (e.g., remote data repository 74).

In some embodiments, the AR architecture 600 comprises a pose estimation system 640 configured to execute instructions to carry out a pose estimation process based on, in part, data stored in the buffer 620 and the map database 630 to determine location and orientation of the wearable computing hardware or device. For example, position, location, or orientation data may be computed from data collected by camera 610 as it is read into buffer 620 as the user is experiencing the wearable device and operating in the world. For example, based on the information and collection of objects identified from the data and stored in the buffer 620, the object recognizer 610 may recognize objects 325 and extract these objects as sparse points 320 to the processor (e.g., local processing and data module 70). In some embodiments, the sparse points 320 may be extracted as one or more image segments of a given image frame are read into the buffer 620 and used to estimate the pose of the AR device in the associated image frame. The estimation of the pose may be updated as additional image segments of the image frame are read into the buffer 620 and used to identify additional sparse points. Optionally, in some embodiments, the pose estimation system 640 may access the map database 630 and retrieve sparse points 320 identified in prior captured image segments or image frames and compare the corresponding sparse points 320 between prior and subsequent image frames as the AR device moves through the 3D space, thereby tracking the movement, position, or orientation of the AR device in the 3D space. For example, referring to FIG. 3, the object recognizer 650 may recognize, in each of a plurality of image frames, a sparse point 320a as a lamp 325a. The AR device may attach some descriptor information to associate the sparse point 320a in one image frame to corresponding sparse points 320a of other image frames, and store this information in the map database 650. The object recognizer 650 may be configured to recognize objects for any number of sparse points 320, for example, 1, 2, 3, 4, etc., sparse points.

Once the objects are recognized, the information may be used by the pose estimation system 640 to determine a pose of the AR device. In one embodiment, the object recognizers 650 may identify sparse points corresponding to image segments as the image segments are received, and subsequently may identify additional sparse points when subsequent image segments of the same image frame are received. The pose estimation system 640 may execute instructions to estimate pose based on the first identified sparse points and update the estimation by integrating the subsequently identified sparse points into the estimation process. In another embodiment, alone or in combination, the object recognizers 650 may recognize two sparse points 320a, 320b of two objects (e.g., object 325a and another object shown in FIG. 3) in a first frame, and then identify the same two sparse points in a second frame and subsequent frames (e.g., up to any number of subsequent frames may be considered). Based on a comparison between the sparse points of two or more frames, a pose (e.g., orientation and location) within the 3D space may be also be estimated or tracked through the 3D space.

In some embodiments, the precision of a pose estimation, or reduction of noise in the pose estimation results, may be based on the number of sparse points recognized by the object recognizers 640. For example, in 3D space the position, location, or orientation of an imaging device may be based on translational and rotational coordinates within the environment. Such coordinates may include, for example, X, Y, and Z translational coordinates or yaw, roll, pitch rotational coordinates as described below in connection with FIG. 7. In some embodiments, one sparse point extracted from an image frame may not be able to convey a full pose of the imaging device. However, a single sparse point may be at least one constraint on pose estimation, for example, by providing information related to one or more coordinates. As the number of sparse points increases, the precision of the pose estimation may be improved or the noise or errors in the pose estimation may be reduced. For example, two sparse points may be indicative of an X, Y position of the imaging device in a 3D space based on the object represented by the sparse point. However, the imaging device may not be able to determine its Z position relative to the object (e.g., in front of or behind the object) or its roll coordinate. Accordingly, in some embodiments, three sparse points may be used to determine a pose, however, any number of sparse points may be used (e.g., 1, 2, 4, 5, 6, 7, 10 or more, etc.).

In some embodiments, the pose determination may be performed by a processor on board the AR device (e.g., local processing and data module 70). The extracted sparse points may be inputs into a pose estimation system 640 configured to execute computer vision techniques. In some embodiments, the pose estimation system may comprise a SLAM or V-SLAM (e.g., referring to a configuration wherein the input is images/visual only), executed by the pose estimation system 640, which may then output a sparse point representation 670 of the world surrounding the AR device. In some embodiments, the pose estimation system 640 may be configured to execute a continuously updated recursive Bayesian estimator (e.g., a Kalman Filter). However, the Bayesian estimator is intended as an illustrative example of at least one method for performing pose estimation by the pose estimation system 640, and other methods and processes are envisioned within the scope of the present disclosure. The system can be configured to not only find out wherein the world the various components are, but what the world is made of. The pose estimation may be a building block that achieves many goals, including populating the map database 630 and using the data from the map database 630. In other embodiments, the AR device can be connected to a processor configured to perform the pose estimation through a network (e.g., LAN, WAN, etc.) to access a cloud storage (e.g., remote data repository 74).

In some embodiments, one or more remote AR devices may be configured to determine a pose of each AR device based on a pose determination of a single AR device comprising AR architecture 600. For example, one or more AR devices may be in wired or wireless communication with a first AR device including AR architecture 600. The first AR device may perform a pose determination based on sparse points extracted from the environment as described herein. The first AR device may also be configured to transmit an identifying signal (e.g., an IR signal or other suitable medium) that may be received by one or more remote AR devices (e.g., a second AR device). In some embodiments, a second AR device may be attempting to display similar content as the first AR device and receive the identifying signal from the first AR device. From the identifying signal, the second AR device may be able to determine (e.g., interpret or process the identifying signal) its pose relative to the first AR device without extracting sparse points and performing pose estimation on the second AR device. One non-limiting advantage of this arrangement is that discrepancies in virtual content displayed on the first and second AR devices may be avoided by linking the two AR devices. Another non-limiting advantage of this arrangement is that the second AR system may be able to update its estimated position based on the identifying signal received from the first AR device.

Example of Imaging Device Pose and Coordinate System

Figure 7:
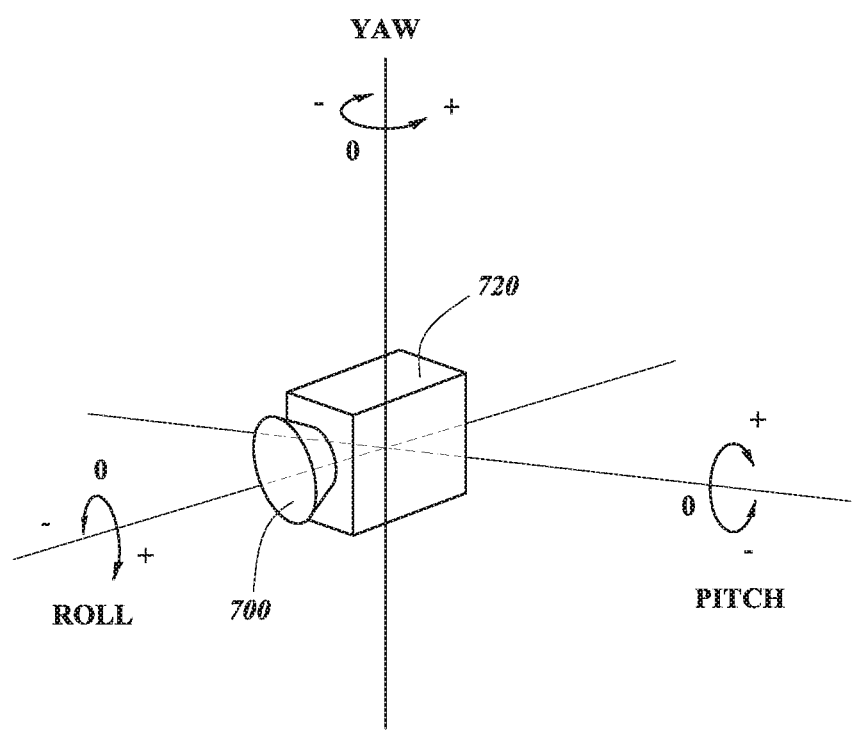
FIG. 7 is an example coordinate system for pose.

FIG. 7 is an example of a coordinate system for imaging device pose. The device 700 may have multiple degrees of freedom. As the device 700 moves toward different directions, the position, location, or orientation of the device 700 will change relative to a starting position 720. The coordinate system in FIG. 7 shows three translational directions of movement (e.g., X, Y, and Z directions) that can be used for measuring the device movement relative to the starting position 720 of the device to determine a location within the 3D space. The coordinate system in FIG. 7 also shows three angular degrees of freedom (e.g., yaw, pitch, and roll) that can be used for measuring the device orientation relative to the starting direction 720 of the device. As illustrated in FIG. 7, the device 700 may also be moved horizontally (e.g., X direction or Z direction) or vertically (e.g., Y direction). The device 700 can also tilt forward and backward (e.g., pitching), turning left and right (e.g., yawing), and tilting side to side (e.g., rolling). In other implementations, other techniques or angular representations for measuring head pose can be used, for example, any other type of Euler angle system.

FIG. 7 illustrates a device 700 which may be implemented, for example, as a wearable display system 100, AR device, imaging device, or any other device described herein. As described throughout the present disclosure, the device 700 may be used to determine the pose. For example, where the device 700 is an AR device comprising AR architecture 600 of FIG. 6, the pose estimation system 640 may use image segment inputs to extract sparse points for use in a pose estimation process, as described above, to track the devices movement in the X, Y, or Z directions or track the angular movement in yaw, pitch, or roll.

Example Routine for Estimating Pose in 3D Space

Figure 8:
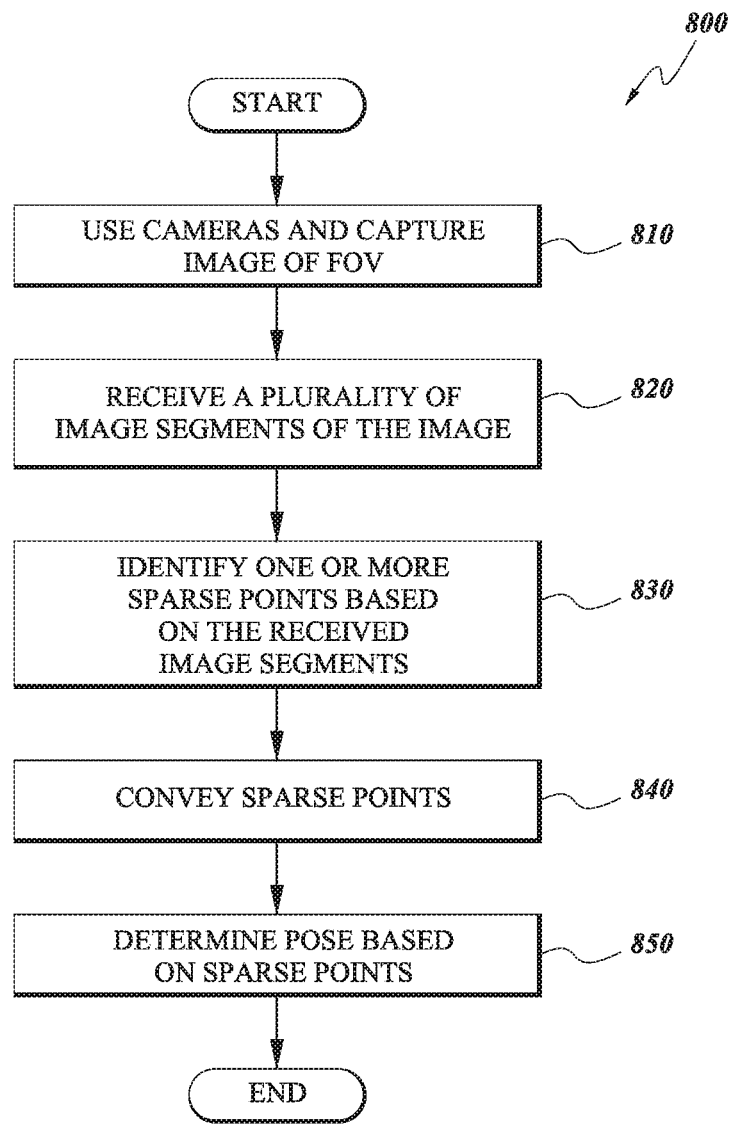
FIG. 8 is a process flow diagram of an example of a method of determining a pose of an imaging device in a 3D space.

FIG. 8 is a process flow diagram of an illustrative routine for determining a pose of an imaging device (e.g., outward-facing imaging system 110 of FIG. 2) in a 3D space (e.g., FIG. 3), in which the imaging device moves. The routine 800 describes how a plurality of sparse points may be extracted from an image frame representing a FOV (e.g., FOV 315a, 315b, 315c, or 315d) to determine a one of position, location, or orientation of the imaging device in the 3D space.

At block 810, an imaging device may capture an input image regarding the environment surrounding the AR device. For example, the imaging device may sequentially capture a plurality of image segments of the input image based on light received from the surrounding environment. This may be achieved through various input devices (e.g., digital cameras on the AR device or remote from the AR device). The input may be an image representing a FOV (e.g., FOV 315a, 315b, 315c, or 315d) and include a plurality of sparse points (e.g., sparse points 320). The FOV camera, sensors, GPS, etc., may convey information including image data of sequentially captured image segments to the system (block 810) as the image segments are captured by the imaging device.

At block 820, the AR device may receive the input image. In some embodiments, the AR device may sequentially receive a plurality of image segments forming a portion of image captured at block 810. For example, as described above, the outward-facing imaging system 110 may be a rolling shutter camera configured to sequentially scan a scene thereby sequentially capturing plurality of image segments and sequentially reads off the image data to a storage unit as the data is captured. The information may be stored on the user-wearable system (e.g., the local processing and data module 70) or may partly reside at networked storage locations accessibly by wired or wireless networks (e.g., remote data repository 74). In some embodiments, the information may be temporarily stored in a buffer included in the storage unit.

At block 830, the AR device may identify one or more sparse points based on the received image segments. For example, the object recognizer may crawl through the image data corresponding to the received image segments and identify one or more objects (e.g., objects 325). In some embodiments, identifying one or more sparse points may be based on receiving image segments corresponding to the one or more sparse points, as described below with reference to FIGS. 9A and 9B. The object recognizers may then extract the sparse points, which may be used as inputs for determining pose data (e.g., imaging device pose within the 3D space). This information may then be conveyed to the pose estimation process (block 840), and the AR device may accordingly utilize the pose estimation system to map the AR device through the 3D space (block 850).

In various embodiments, the routine 800 may be performed by a hardware processor (e.g., the local processing and data module 70 of FIG. 2) configured to execute instructions stored in a memory or storage unit. In other embodiments, a remote computing device (in network communication with the display apparatus) with computer-executable instructions can cause the display apparatus to perform aspects of the routine 800.

As described above, current pose estimation processes may include a delay in estimating pose of an AR device due to transferring the data (e.g., the extracted sparse points) from the image capture device to the pose estimation system. For example, current implementations may require the entire image frame to be transferred from the image capture device to the pose estimator (e.g., SLAM, VSLAM, or similar). Once the entire image frame is transferred, the object recognizer is permitted to identify sparse points and extract them to the pose estimator. Transferring an entire image frame may be one contributing factor to the delay of estimating a poser.

Example Extracting Sparse Points from Image Frames

Figure 9:
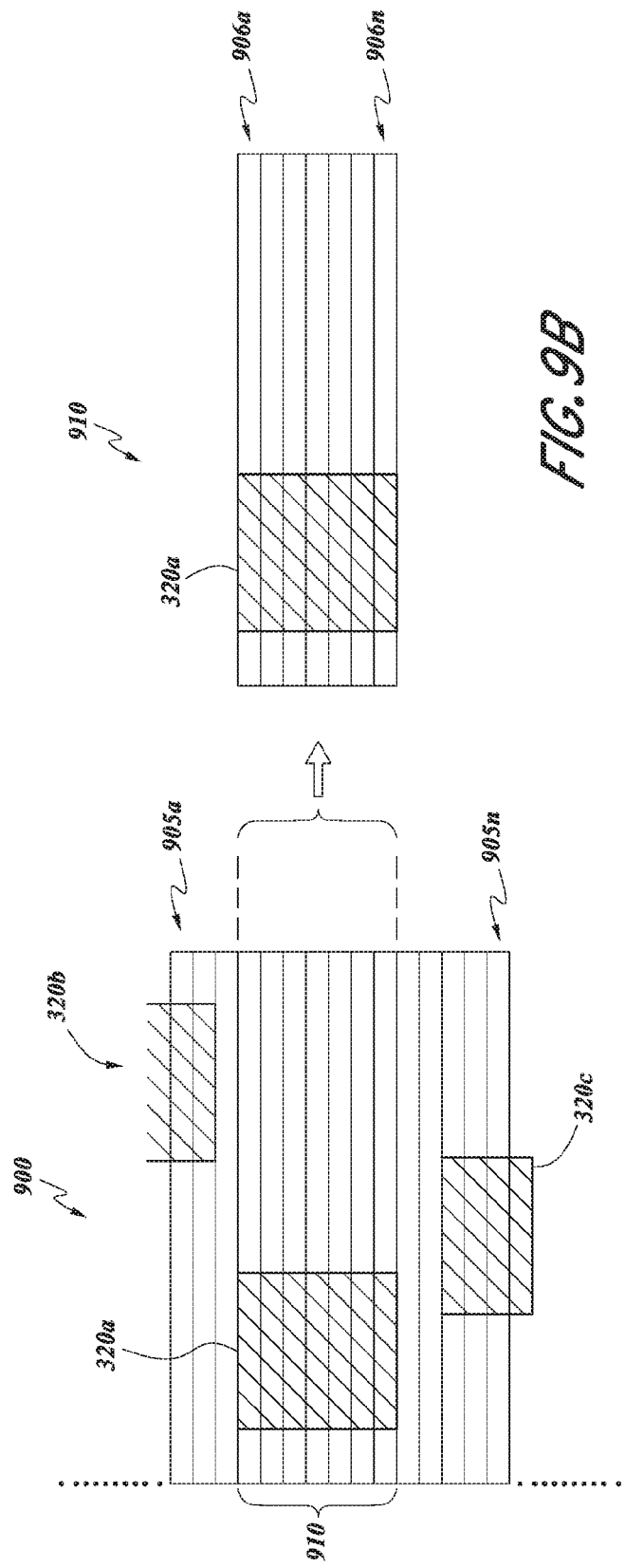
FIGS. 9A and 9B schematically illustrate an example of extracting one or more sparse points from an image frame based on receiving multiple image segments.

FIGS. 9A and 9B schematically illustrate an example of extracting one or more sparse points from an image frame based on receiving multiple image segments. In some implementations, FIGS. 9A and 9B may also schematically illustrate an example method of minimizing delay in estimating a pose of an imaging device (e.g., outward-facing imaging device 110 of FIG. 2) through a 3D space. In some embodiments, FIGS. 9A and 9B also schematically depict an example of identifying one or more sparse points of an image frame 900. In some implementations, FIGS. 9A and 9B illustrate an image frame as it is read into a storage unit from an imaging device by a rolling shutter camera, as described above. The image frame 900 may be captured by an outward-facing imaging system 110 configured as a progressive scan imaging device. The image frame may comprise a plurality of image segments (sometimes referred to as scan lines) 905a to 905n that are read into the storage unit (e.g., local processing and data module 70) from imaging device as the image segments are captured by the imaging device. The image segments may be horizontally arranged (as shown in FIG. 9A) or vertically arranged (not shown). While 15 image segments are illustrated, the number of image segments need not be so limited, and may be any number of image segments 905a to 905n as desired for a given application or based on the capabilities of the imaging system. In some implementations, an image segment may be a line (e.g., a row or column) in a raster scanning pattern, for example, the image segment may be a row or column of pixels in a raster scanning pattern of an image captured by the outward-facing imaging device 110. The raster scanning pattern may be performed or executed by a rolling shutter camera, as described throughout the present disclosure.

Referring again to FIG. 9A, the image frame 900 may comprise a plurality of image segments 905 that are sequentially captured and read into the storage unit. The image segments 905 may be combined to represent a field of view (FOV) captured by the imaging device. The image frame 900 may also comprise a plurality of sparse points 320, for example, as described above with reference to FIG. 3. In some implementations, as illustrated in FIG. 9A, each sparse point 320 may be generated by one or more image segments 905. For example, the sparse point 320a may be generated by subset 910 of image segments 905 and thus associated thereto. Thus, each sparse point may be identified upon receiving the subset of image segments 905 corresponding to each given sparse point when the image segments are received at the storage unit. For example, sparse point 320a may be identified by an object recognizer (e.g., object recognizer 650) as soon as image segments 906a through 906n are received at the storage unit of the AR device. The image segments 906a through 906n may correspond to subset 910 of image segments 905 representing the sparse point 320a. Thus, the AR device may be able to determine individual sparse points as soon as the corresponding image segments have been received from the image capture device (e.g., a progressive scan camera). The subset 910 of image segments 905 may comprise image segments 906a through 906n. In some implementations, the number of image segments 906 may be based on the number of image segments sequentially received in a vertical direction needed to resolve or capture the entire sparse point along the vertical direction. While FIG. 9B illustrates 7 image segments associated with sparse point 320a, this need not be the case and any number of image segments may be associated with sparse point 320a as needed to identify the object 325a corresponding to the sparse point 320a (e.g., 2, 3, 4, 5, 6, 8, 9, 10, 11, etc.).

In an example implementation, the sparse points 320 may be identified by implementing a circular or rolling buffer. For example, the buffer may be similar to the buffer 620 of FIG. 6. The buffer may be constructed as a portion of a memory or storage unit stored on board the AR device (e.g., local processing and data module 70) or may be remote to the AR device (e.g., remote data repository 74). The buffer may be configured to receive image information from the image capture device (e.g., outward-facing imaging system 110 of FIG. 2). For example, the buffer may sequentially receive image data representative of the image segments from the image sensor as the image sensor captures each sequential image segment. The buffer may also be configured to store a portion of the image data for subsequent processing and identification of image content. In some embodiments, the buffer may be configured to store one or more image segments, wherein the number of image segments may be less than the total image frame 900. In some embodiments, the number of image segments stored in the buffer may be a predetermined number, for example, the number in subset 910. In some embodiments, alternatively or in combination, the buffer may be configured to store a subset 910 of image segments corresponding to a sparse point. For example with reference to FIG. 9B, the sparse point 320a may require a 7×7 pixel window (e.g., 7 rows of pixels presenting the image segments 906, where each image segment comprises 7 pixels). In this embodiment, the buffer may be configured to be large enough to store the subset 910 of image segments 906, for example, the 7 image segments illustrated.

As described above, the buffer may be configured to temporarily store image data. Accordingly, as new image segments are received from the imaging capture device, the older image segments are removed from the buffer. For example, a first image segment 906a may be received and subsequent image segment may be received at the buffer corresponding to sparse point 320a. Once, all image segments 906a through 906n are received, the sparse point 320a may be identified. Subsequently, a new image segment is received (e.g., 906n+1) and image segment 906a is thereby removed from the buffer. In some embodiments, the segment 906a is moved from the buffer to storage in the digital memory (e.g., local processing and data module 70) for further processing.

Example Routine for Estimating Pose in 3D Space

Figure 10:
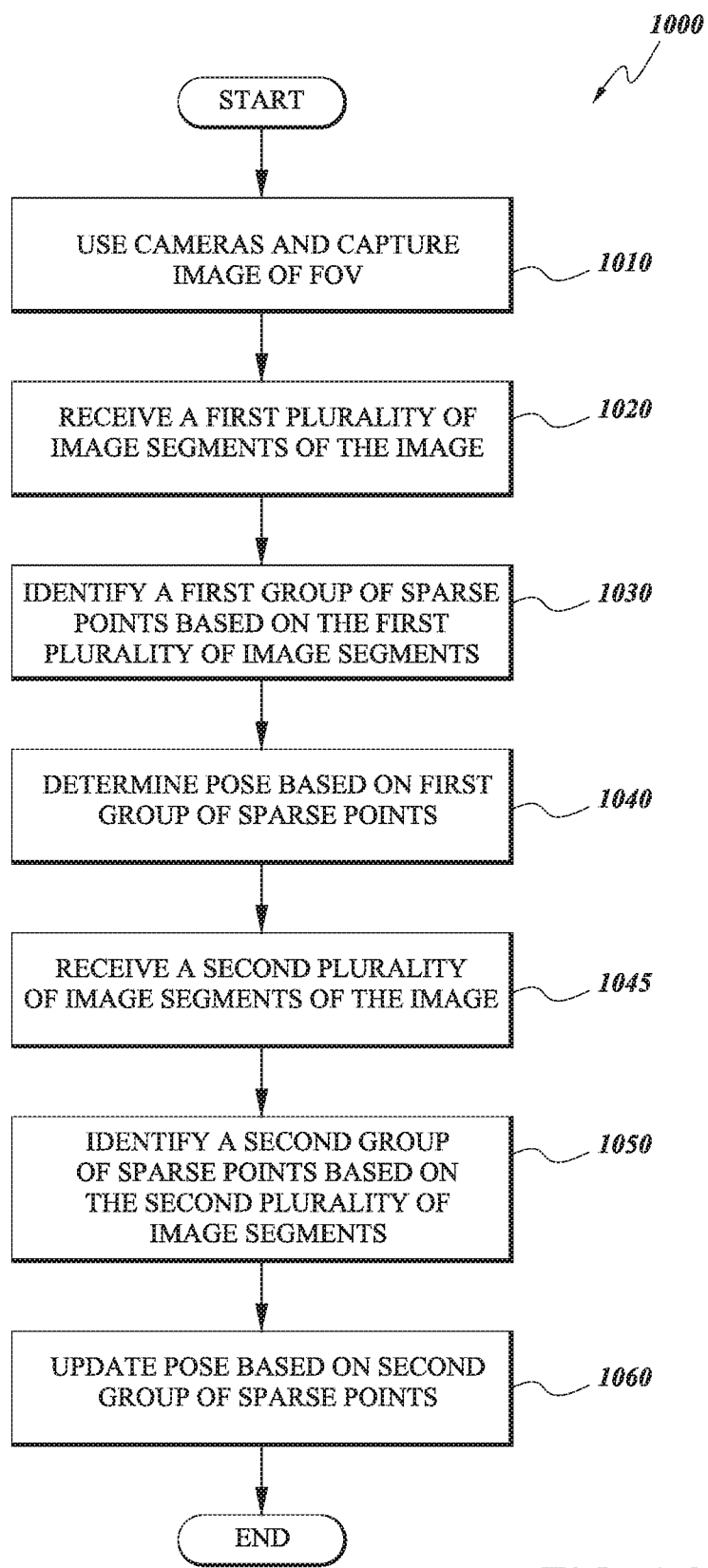
FIG. 10 is a process flow diagram of another example of a method of determining a pose of an imaging device in a 3D space.

FIG. 10 is a process flow diagram of an illustrative routine for determining a pose of an imaging device (e.g., outward-facing imaging system 110 of FIG. 2) in a 3D space (e.g., FIG. 3), in which the imaging device moves. The routine 1000 describes an example of how a first group of sparse points may be extracted from an image frame as image segments corresponding to the sparse points of the first group of sparse points are received. In various embodiments, the corresponding image segments may be captured prior to capturing the entire image frame representing an FOV of the imaging device. The routine 1000 also describes how subsequent sparse points or a second group of sparse points may be extracted and integrated to update the pose determination. The routine 1000 may be performed by a hardware processor (e.g., local processing and data module 70 of FIG. 2) operably coupled to an outward-facing imaging system (e.g., outward-facing imaging system 110) and a digital memory, or buffer, as described above. The outward-facing imaging system 110 can comprise a rolling-shutter camera.

At block 1010, the imaging device may capture an input image regarding the environment surrounding the AR device. For example, the imaging device may sequentially capture a plurality of image segments of the input image based on light received from the surrounding environment. This may be achieved through various input devices (e.g., digital cameras on the AR device or remote from the AR device). The input may be an image frame representing a FOV (e.g., FOV 315a, 315b, 315c, or 315d) and include a plurality of sparse points (e.g., sparse points 320). The FOV camera, sensors, GPS, etc., may convey information including image data of sequentially captured image segments to the system (block 1010) as the image segments are captured by the imaging device.

At block 1020, the AR device may receive the input image. In some embodiments, the AR device may sequentially receive a first plurality of image segments forming a portion of image captured at block 1010. For example, the imaging device may be configured to sequentially scan a scene thereby sequentially capturing a first plurality of image segments as described above with reference to FIGS. 9A and 9B. The image sensor may also sequentially read off the image data to a storage unit as the data is captured. The information may be stored on the user-wearable system (e.g., the local processing and data module 70) or may partly reside at networked storage locations accessible by wired or wireless network (e.g., remote data repository 74). In some embodiments, the information may be temporarily stored in a buffer included in the storage unit.

At block 1030, the AR device may identify a first group of sparse points based on receiving the first plurality of image segments (sometimes referred to as a "pre-list") corresponding to each sparse point. For example, with reference to FIGS. 9A and 9B, the AR device may identify one or more sparse points 320 based on receiving a subset 910 of image segments 905 (e.g., a first plurality of image segments) corresponding to the one or more sparse points 320 as described above with reference to FIGS. 9A and 9B.

The sparse points 320 may be identified as soon as the subset 910 of image segments 905 corresponding to the sparse points 320 are received (e.g., image segments 906) at the storage unit (e.g., local processing and data module 70).

In some implementations, the first group of sparse points comprises an arbitrary number of sparse points ($N_1$). The number ($N_1$) may be any number of sparse points selected to estimate the pose of the AR device with the environment. In some embodiments, the number ($N_1$) may not be less than three sparse points. In other embodiments, the number ($N_1$) is between 10 and 20 sparse points. One non-limiting advantage of a greater number ($N_1$) is that outlier data points may be rejected, which may provide the pose determination with some robustness to noise due to inlier data points. For example, an imaging device may be jilted or shook due to an event imparted onto the physical imaging device, or the scene being recorded could be temporarily changed (e.g., a person moving in the foreground). The event may only impact a small group of sparse points in one or more image frames. Using a greater number ($N_1$) of sparse points or updating the pose estimation in accordance with the present specification, noise in the pose estimation due to these outliers or single instance events may be at least partially reduced.

In one implementation, the first group of sparse points may be extracted from the image frame (e.g., by object recognizers 650) and conveyed to the pose estimation system (e.g., pose estimation system 640 of FIG. 6) configured to execute a pose determination (e.g., a SLAM, VSLAM, or similar as described above) (block 1040). In various embodiments, the first group of sparse points is conveyed to the pose estimation system upon identifying the number ($N_1$) of sparse points based on receiving the corresponding first plurality of image segments. Accordingly, the first group of sparse points maybe conveyed when only a portion of the image frame has been received because the imaging devices have not received the entire image frame; subsequent image segments (e.g., a second plurality of image segments obtained after the first plurality of image segments) remain to be received. In one embodiment, the first group of sparse points may be extracted (e.g., from the storage unit of the AR device or a portion thereof, for example, the buffer) as soon as each is identified based on scanning the corresponding subset of image segments. In another embodiment, the first group of sparse points may be extracted (e.g., from the storage unit of the AR device or the buffer) once the number ($N_1$) of sparse points is identified, and the sparse points are transmitted in a single process.

At block 1045, the AR device may receive a second plurality of image segments (sometimes referred to as a "follow-list"). In some embodiments, the AR device may sequentially obtain the second plurality of image segments after receiving the first plurality of image segments at block 1020. For example, the imaging device may be configured to sequentially scan a scene thereby sequentially capturing the first plurality of image segments (e.g., block 1020) and subsequently, either after or during block 1030, sequentially scanning the scene to obtain the second plurality of image segments, as described above with reference to FIGS. 9A and 9B. In another embodiment, the second plurality of image segments, or a portion thereof, may be obtained from a second image captured by the imaging device, the second image captured after the first image. The information may be stored on the AR device (e.g., the local processing and data module 70) or may partly reside at networked storage locations accessible by wired or wireless network (e.g., remote data repository 74). In some embodiments, the information may be temporarily stored in a buffer included in the storage unit.

Referring again to FIG. 10, at block 1050 the AR device may identify a second group of sparse points based on the second plurality of image segments. For example, in one embodiment, the entire image frame has not been received prior to determining the pose at block 1040 and the second plurality of image segments may be received from the imaging device at block 1045. Thus, the AR device may identify one or more new sparse points based on receiving the second plurality of image segments corresponding to the one or more new sparse points (e.g., the second group of sparse points) as described above with reference to FIGS. 9A and 9B. In another embodiment, a second image may be captured by the imaging device after the first image is captured at block 1010, and the second plurality of image segments may be obtained from the second image. Thus, the AR device may identify one or more new sparse points based on receiving the second plurality of image segments from the second image, which may correspond to the second group of sparse points. In some embodiments, the second group of sparse points may comprise any number of new sparse points (e.g., 1, 2, 3, etc.). In one implementation, the second group of sparse points may be extracted and integrated into the pose determination, for example, by conveying the second group of sparse points to the pose estimation system. Below are example methods of integrating the second group of sparse points with the first group of sparse points into the mapping routine of FIG. 10. For example, example integration methods described herein may be referred to as reintegration, sliding scale integration, or block integration. However, these example integration methods are not intended to be exhaustive. Other methods are possible that may minimize errors and decrease delays in the pose determination.

At block 1060, the pose estimation system may be configured to update the pose determination based on the pose determination at block 1040 and the reception of the second group of sparse points at block 1050.

One non-limiting advantage of the routine 1000 described above may be a reduction in the delay that results from extracting sparse points from an image frame prior to the pose estimation process. For example, by computing and identifying individual sparse points when the image segments corresponding to those sparse points are received at the buffer 620, the individual or a selected group of sparse points may be extracted to, and processed by, the pose estimation system without waiting for the entire image frame to be captured. Thus, the pose estimation may be performed well before the entire image is transferred to the memory and before all the sparse points can be extracted from the entire image. However, once the first group and all subsequent groups of a particular image frame have been extracted, the entire image frame would then be available for pose estimation.

In various implementations, the second group of sparse points may comprise a set number of sparse points identified after determining the pose at block 1040. In some embodiments, the set number may be one sparse point. For example, each time a subsequent sparse point is identified the sparse point can be conveyed to the pose estimation system and a new pose estimation process performed at block 1060 to update one or more of the position, location, or orientation of the AR device. This method may sometimes be referred to as a reintegration method. Accordingly, each subsequently identified sparse point may represent a subsequent group of sparse points (e.g., a second, third, fourth, etc. group of sparse points). In another embodiment, the set number may be any number of subsequently identified sparse points (e.g., 2, 3, 4, etc.). For example, where the set number is 3, each time 3 new sparse points are identified (e.g., a subsequent group of sparse points), the group is conveyed to the pose estimation system at block 1050 and a new pose estimation process is performed at block 1060. The pose estimation process may thus utilize all the sparse points included in the entire image frame.

In other implementations, integration methods may be configured to account for the rolling shutter effect as described above with reference to FIGS. 4A-5B. For example, the pose estimation process may be performed for a fixed number ($N_2$) of sparse points. This method may sometimes be referred to as a sliding integration method. In this embodiment, the second group of sparse points may comprise a selected number ($k_2$) of sparse points identified after determining the pose at block 1040. Each time a number ($k_2$) of sparse points may be identified, the pose determination may be updated. However, only the most recent $N_2$ sparse points may be used to update the pose at block 1060. In some embodiments, this method utilizes the most recent $N_2$ sparse points, regardless of which group they correspond. For example, if $N_1$ is set to 10, $N_2$ is set to 15, and $k_2$ is set to 5, then the first group of sparse points comprises the first 10 sparse points identified at block 1030. Thus, the pose is determined at block 1040 based on the first 10 sparse points. Subsequently, a new sparse point is identified, but the pose is not updated. Once 5 new sparse points are identified, comprising the second group of sparse points, the pose may be updated based on the first ($N_1$) and second ($k_2$) group of sparse points. If a third group of sparse points are identified (e.g., 5 sparse points subsequent to the second group), then the pose is updated again at block 1060, however, the update may be based on some of the first group (e.g., sparse points 6-10), the second group (e.g., sparse points 11-15), and the third group (e.g., sparse points 16-21). Thus, the integration may be considered a sliding window or sliding list of sparse points, whereby only a set number of sparse points are used to estimate the pose and the sparse points used slides from the first group through the second and third groups. One non-limiting advantage of this method may be that sparse points identified from earlier received image segments can be removed from the pose determination at block 1060 as they become old or stale. In some cases if the AR device is in motion relative to the sparse points, the rolling shutter effect may be reduced by removing old sparse points and capturing the change in pose between identified new sparse points.

In some embodiments, the preceding integration method may be utilized between image frames, for example, as the outward-facing imaging system 110 moves between capturing an image frame of FOV 315a and capturing an image frame for FOV 315b of FIG. 3. For example, a first group of sparse points may be received from an image frame associated with a first position 312a (e.g., FOV 315b), and the second group of sparse points may be received from an image frame associated with a second position 312b (e.g., FOV 315b). The sliding list method may be implemented to reduce the rolling shutter effects between these image frames. However, in some embodiments, it may not be necessary to retain more than the most recent ($N_2$–1) sparse points from the first frame.

In another implementation, the pose determination at block 1060 may be performed for a fixed number or block of sparse points. This method may sometimes be referred to as a block integration method. In some embodiments, each of the groups of sparse points may comprise a number of sparse points equal to the block. For example, if the block is set to 10, the fixed number ($N_1$) for the first group is 10, and the pose is determined at block 1040 upon identifying and extracting this first group. Subsequently, a second group may be identified comprising the next 10 sparse points, and the pose is updated at block 1060 using this second group. In some embodiments, this process may continue for multiple groups (e.g., a third, fourth, fifth, etc.). In some embodiments, when the image segments are stored in a buffer (e.g., buffer 620 of FIG. 6, the size of the buffer may be selected and configured to store at least the number of sparse points that may be included in the block (e.g., the buffer may be selected to have a size configured to store at least 10 sparse points in the above example). In some embodiments, the buffer may have a size restricted to only store the number of sparse points comprised in the block.

While various embodiments of methods, devices, and systems are described throughout the present disclosure with reference to head-mounted display devices or AR devices, this is not intended to limit the scope of the present application, and are merely used as examples for illustrative purposes. The methods and devices described herein may be applicable to other devices such as robotics, digital cameras, and other autonomous entities that may implement the methods and devices described herein to map a 3D environment in which the device is location, and track the movements of the device through the 3D environment.

Additional Aspects

In a 1st aspect, a method for estimating a position of an image capture device within an environment is disclosed. The method comprises: sequentially receiving a first plurality of image segments, the first plurality image segments forming at least a portion of an image representing a field of view (FOV) of the image capture device, the FOV comprising a portion of the environment around the image capture device including a plurality of sparse points, wherein each sparse point corresponds to a subset of image segments; identifying a first group of sparse points, the first group of sparse points comprising one or more sparse points that are identified as the first plurality of image segments are received; determining, by a position estimation system, the position of the image capture device within the environment based on the first group of sparse points; sequentially receiving a second plurality of image segments, the second plurality of image segments received after the first plurality of image segments and forming at least another portion of the image; identifying a second group of sparse points, the second group of sparse points comprising one or more sparse points that are identified as the second plurality of image segments are received; and updating, by the position estimation system, the position of the image capture device within the environment based on the first and second group of sparse points.

In a 2nd aspect, the method of aspect 1, further comprising sequentially capturing the plurality of image segments at an image sensor of the image capture device.

In a 3rd aspect, the method of aspects 1 or 2, wherein image sensor is a rolling shutter image sensor.

In a 4th aspect, the method of any one of aspects 1-3, further comprising storing the first and second plurality of image segments in a buffer as the image segments are sequentially received, the buffer having a sized corresponding to the number of image segments in the subset of image segments.

In a 5th aspect, the method of any one of aspects 1-4, further comprising extracting the first and second groups of sparse points to the position estimation system.

In a 6th aspect, the method of any one of aspects 1-5, wherein the first group of sparse points comprises a number of sparse points.

In a 7th aspect, the method of aspect 6, wherein the number of sparse points is between 10 and 20 sparse points.

In an 8th aspect, the method of any one of aspects 1-7, wherein the second group of sparse points comprises a second number of sparse points.

In a 9th aspect, the method of any one of aspects 1-8, wherein said updating the position of the image capture device is based on a number of the most recently identified sparse points, wherein the most recently identified sparse points is at least one of the first group, the second group, or one or more of the first group and the second group.

In a 10th aspect, the method of aspect 9, wherein the number of the most recently identified sparse points is equal to the number of sparse points in the first group of sparse points.

In an 11th aspect, the method of any one of aspects 1-10, wherein position estimation system is configured to perform visual simultaneous localization and mapping (V-SLAM).

In a 12th aspect, the method of any one of aspects 1-11, wherein the plurality of sparse points are extracted based on at least one of a real-world object, a virtual image element, and a non-visible indicator projected into the environment.

In a 13th aspect, a method for estimating a position of an image capture device within an environment is disclosed. The method comprises: sequentially receiving a plurality of image segments, the plurality of image segments forming an image representing a field of view (FOV) of the image capture device, the FOV comprising a portion of the environment around the image capture device including a plurality of sparse points, wherein each sparse point is identifiable based in part on a corresponding subset of image segments of the plurality of image segments; sequentially identifying one or more sparse points of the plurality of sparse points when each subset of image segments corresponding to the one or more sparse points is received; and estimating a position of the image capture device in the environment based on the identified the one or more sparse points.

In a 14th aspect, the method of aspects 13, wherein sequentially receiving the plurality of image segments further comprises receiving a number of image segments and storing the number of image segments in a buffer.

In a 15th aspect, the method of aspects 13 or 14, wherein sequentially receiving the plurality of image segments comprises receiving at least a first image segment and a second image segment, wherein the first image segment is stored in the buffer.

In a 16th aspect, the method of any one of aspects 13-15, further comprising: updating the buffer upon receiving a second image segment; storing the second image segment in the buffer; and, upon receiving the second image segment, removing the first image segment.

In a 17th aspect, the method of aspect 16, wherein sequentially identifying one or more sparse points further comprises scanning the image segments stored in the buffer when the buffer is updated.

In an 18th aspect, the method of any one of aspects 13-17, wherein sequentially identifying one or more sparse points of the plurality of sparse points when each subset of image segments corresponding to the one or more sparse points is received further comprises: sequentially identifying a first group of one or more sparse points when a first plurality of image segments corresponding to the one or more sparse points of the first group is received; and sequentially identifying a second group of one or more sparse points when a second plurality of image segments corresponding to the one or more sparse points of the second group is received, wherein the second plurality of image segments is received after the first plurality of image segments.

In a 19th aspect, the method of any one of aspects 13-18, wherein estimating a position of the image capture device is based on identifying the first group of one or more sparse points, wherein the first group comprises a number of sparse points.

In a 20th aspect, the method of aspect 19, wherein the number of sparse points is between 2 and 20.

In a 21st aspect, the method of aspect 19, wherein the number of sparse points is between 10 and 20.

In a 22nd aspect, the method of any one of aspects 13-21, further comprising updating the position of the image capture device based on identifying a second group of one or more sparse points.

In a 23rd aspect, the method of any one of aspects 13-22, wherein the second group of one or more sparse points comprises a second number of sparse points.

In a 24th aspect, the method of any one of aspects 13-23, further comprising updating the position of the image capture device based on identifying a number of the sequentially identified sparse points.

In a 25th aspect, the method of aspect 24, wherein the number of sequentially identified sparse points is equal to the number of sparse points.

In a 26th aspect, the method of aspect 24, wherein the number of sequentially identified sparse points comprises at least one of the sparse points of the first group of sparse points.

In a 27th aspect, the method of any one of aspects 13-26, wherein the plurality of sparse points are extracted based on at least one of a real-world object, a virtual image element, and an non-visible indicator projected into the environment.

In a 28th aspect, the method of any one of aspects 13-27, further comprising: extracting the sequentially identified sparse points from the buffer; and sending the sequentially identified sparse points to a visual simultaneous location and mapping (VSLAM) system, wherein the VSLAM system estimates the position of the image capture device based on the sequentially identified one or more sparse points.

In a 29th aspect, an augmented reality (AR) system is disclosed. The AR system comprises an outward-facing imaging device, computer hardware, and a processor operatively coupled to the computer hardware and outward-facing imaging device and configured to execute instruction to perform the method of any one of aspects 1-28.

In a 30th aspect, the AR system of aspect 29, wherein the outward-facing imaging device is configured to detect light in the non-visible spectrum.

In a 31st aspect, the AR system of aspects 29 or 30, wherein the AR system is configured to display one or more virtual image elements.

In a 32nd aspect, the AR system of any one of aspects 29-31, further comprising a transceiver configured to transmit an identifying signal indicative of the estimated position of the AR system to a remote AR system, wherein the remote AR system is configured to update its estimated position based on the received identifying signal.

In a 33rd aspect, an autonomous entity is disclosed. The autonomous entity comprises an outward-facing imaging device, computer hardware, and a processor operatively coupled to the computer hardware and outward-facing imaging device and configured to execute instruction to perform the method of any one of aspects 1-28.

In a 34th aspect, the autonomous entity of aspect 33, wherein the outward-facing imaging device is configured to detect light in the non-visible spectrum.

In a 35th aspect, a robotic system is disclosed. The robotic system comprises an outward-facing imaging device, computer hardware, and a processor operatively coupled to the computer hardware and outward-facing imaging device and configured to execute instruction to perform the method of any one of aspects 1-28.

In a 36th aspect, an image capture device for estimating a position of the image capture device in an environment is disclosed. The image capture device comprises: an image sensor configured to capture an image via sequentially capturing a plurality of image segments, the image representing a field of view (FOV) of the image capture device, the FOV comprising a portion of the environment around the image capture device including a plurality of sparse points, wherein each sparse point is identifiable based in part on a corresponding subset of the plurality of image segments; a memory circuit configured to store the subsets of image segments corresponding to one or more sparse points; a computer processor operatively coupled to the memory circuit and configured to: sequentially identify one or more sparse points of the plurality of sparse points when each subset of image segments corresponding to the one or more sparse points is received; and extract the sequentially identified one or more sparse points for estimating a position of the image capture device in the environment based on the identified the one or more sparse points.

In a 37th aspect, the image capture device of aspect 36, further comprising a position estimation system configured to: receive the sequentially identified one or more sparse points; and estimate the position of the image capture device in the environment based on the identified the one or more sparse points.

In a 38th aspect, the image capture device of aspects 36 or 37, wherein the position estimation system is a visual simultaneous location and mapping (VSLAM) system.

In a 39th aspect, the image capture device of any one of aspects 36-38, wherein the image sensor is configured to detect light in the non-visible spectrum.

In a 40th aspect, the image capture device of any one of aspects 36-39, further comprising a transceiver configured to transmit an identifying signal indicative of its estimated position to a remote image capture device, wherein the remote image capture device is configured to update its estimated position based on the received identifying signal.

OTHER CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) or specialized graphics processing units may be necessary to perform the functionality, for example, due to the volume or complexity of the calculations involved or to provide results, for example, pose estimation inputs, substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An imaging system comprising:
    an image capture device comprising a lens and an image sensor, the lens configured to direct light from an environment surrounding the image capture device to the image sensor, the image sensor configured to:
        sequentially capture a first plurality of image segments of an image based on the light from the environment, the image representing a field of view (FOV) of the image capture device, the FOV comprising a portion of the environment and including a plurality of sparse points, and
        sequentially capture a second plurality of image segments, the second plurality of image segments captured after the first plurality of image segments and forming at least another portion of the image;
    non-transitory data storage configured to sequentially receive the first and second plurality of image segments from the image sensor and store instructions for estimating at least one of a position and orientation of the image capture device within the environment; and
    at least one hardware processor operably coupled to the non-transitory data storage and configured by the instructions to:
        identify a first group of sparse points based in part on a corresponding subset of the first plurality of image segments, the first group of sparse points identified as the first plurality of image segments are received at the non-transitory data storage,
        determine at least one of the position and orientation of the imaging device within the environment based on the first group of sparse points,
        identify a second group of sparse points based in part on a corresponding subset of the second plurality of image segments, the second group of sparse points identified as the second plurality of image segments are received at the non-transitory data storage, and
        update the at least one of the position and orientation of the imaging device within the environment based on the first and second group of sparse points.

2. The imaging system of claim 1, wherein the image sensor is a rolling shutter image sensor.

3. The imaging system of claim 1, wherein the non-transitory data storage comprises non-transitory buffer storage configured to sequentially receive the first and second plurality of image segments as the image segments are captured by the image sensor, the non-transitory buffer storage having a storage capacity based at least partly on a number of image segments included in each subset of image segments.

4. The imaging system of claim 1, wherein the first group of sparse points or the second group of sparse points comprises a number of sparse points between 10 and 20 sparse points.

5. The imaging system of claim 1, wherein the hardware processor is configured to update the at least one of the position and orientation of the image capture device based on a number of the most recently identified sparse points, wherein the most recently identified sparse points comprises at least one of the first group of sparse points, the second group of sparse points, and one or more of the first and the second group of sparse points.

6. The imaging system of claim 5, wherein the number of the most recently identified sparse points is equal to a number of sparse points in the first group of sparse points.

7. The imaging system of claim 1, wherein the hardware processor is configured to perform a visual simultaneous localization and mapping (V-SLAM) algorithm.

8. The imaging system of claim 1, wherein the plurality of sparse points are identified based on at least one of a real-world object, a virtual image element, and a non-visible indicator projected into the environment.

9. A head mounted display (HMD) configured to be worn on the head of a user, the HMD comprising:
    a frame;
    a display supported by the frame and disposed forward of an eye of the user;
    an outward facing image capture device disposed on the frame and comprising a lens and an image sensor, the lens configured to direct light from an environment surrounding the HMD to the image sensor and the image sensor configured to sequentially capture a plurality of image segments of an image based on the light from the environment, the image representing a field of view (FOV) of the outward facing image capture device, the FOV comprising a portion of an environment and including a plurality of sparse points, wherein each sparse point is identifiable in part based on a corresponding subset of the plurality of image segments;
    non-transitory data storage configured to sequentially receive the plurality of image segments from the image sensor and store instructions for estimating at least one of a position and orientation of the HMD within the environment; and
    at least one hardware processor operably coupled to the non-transitory data storage and configured by the instructions to:
        sequentially identify one or more sparse points of the plurality of sparse points when each subset of image segments corresponding to the one or more sparse points is received at the non-transitory data storage, and
        estimate the at least one of the position and orientation of the HMD within the environment based on the identified the one or more sparse points.

10. The HMD of claim 9, wherein the non-transitory data storage comprises a circular or rolling buffer.

11. The HMD of claim 9, wherein the plurality of image segments comprises at least a first plurality of image segments and a second plurality of image segments, and wherein the image sensor is configured to sequentially transmit the first and second image segments to the non-transitory data storage.

12. The HMD of claim 11, wherein the hardware processor is configured to:
sequentially identify a first group of one or more sparse points when the first plurality of image segments corresponding to the one or more sparse points of the first group is received; and
sequentially identify a second group of one or more sparse points when the second plurality of image segments corresponding to the one or more sparse points of the second group is received,
wherein the second plurality of image segments is received after the first plurality of image segments.

13. The HMD of claim 12, wherein the hardware processor is configured to estimate the at least one of the position and orientation of the HMD based on the identified first group of one or more sparse points.

14. The HMD of claim 13, wherein the first group of sparse points or the second group of sparse points comprises a number of sparse points between 2 and 20.

15. The HMD of claim 13, wherein the first group of sparse points or the second group of comprises a number of sparse points between 10 and 20.

16. The HMD of claim 13, wherein the hardware processor is further configured to update the at least one of the position and orientation of the HMD based on the identified second group of one or more sparse points.

17. The HMD of claim 9, wherein the hardware processor is further configured to update the at least one of the position and orientation of the HMD when a number of the sequentially identified one or more sparse points are identified.

18. The HMD of claim 17, wherein the number of sequentially identified one or more sparse points comprises at least one of the sparse points of the first group of one or more sparse points.

19. The HMD of claim 9, wherein the plurality of sparse points are identified based on at least one of a real-world object, a virtual image element, and a non-visible indicator projected into the environment.

20. The HMD of claim 9, wherein the hardware processor is further configured to:
extract the sequentially identified one or more sparse points from the corresponding subset of the plurality of image segments; and
perform a visual simultaneous location mapping (VS-LAM) algorithm on the sequentially identified one or more sparse points to estimate the at least one of the position and orientation of the image capture device.

* * * * *

(12) EX PARTE REEXAMINATION CERTIFICATE (13130th)
United States Patent
Kaehler et al.

(10) Number: US 10,163,011 C1
(45) Certificate Issued: Dec. 31, 2025

(54) ESTIMATING POSE IN 3D SPACE

(71) Applicant: Magic Leap, Inc., Plantation, FL (US)

(72) Inventors: Adrian Kaehler, Los Angeles, CA (US); Gary Bradski, Palo Alto, CA (US)

(73) Assignee: MAGIC LEAP, INC.

Reexamination Request:
No. 90/019,648, Sep. 6, 2024

Reexamination Certificate for:
Patent No.: 10,163,011
Issued: Dec. 25, 2018
Appl. No.: 15/597,694
Filed: May 17, 2017

Related U.S. Application Data

(60) Provisional application No. 62/357,285, filed on Jun. 30, 2016.

(51) Int. Cl.
| | |
|---|---|
| *G06T 7/11* | (2017.01) |
| *G01S 5/16* | (2006.01) |
| *G06T 7/579* | (2017.01) |
| *H04N 23/80* | (2023.01) |
| *H04N 23/951* | (2023.01) |

(52) U.S. Cl.
CPC .............. *G01S 5/163* (2013.01); *G06T 7/579* (2017.01); *H04N 23/80* (2023.01); *H04N 23/951* (2023.01)

(58) Field of Classification Search
CPC ......... G06K 9/00671; G01S 3/00; G06T 7/11; H04N 5/232
See application file for complete search history.

(56) References Cited

To view the complete listing of prior art documents cited during the proceeding for Reexamination Control Number 90/019,648, please refer to the USPTO's Patent Electronic System.

*Primary Examiner* — Joseph R Pokrzywa

(57) ABSTRACT

Methods and devices for estimating position of a device within a 3D environment are described. Embodiments of the methods include sequentially receiving multiple image segments forming an image representing a field of view (FOV) comprising a portion of the environment. The image includes multiple sparse points that are identifiable based in part on a corresponding subset of image segments of the multiple image segments. The method also includes sequentially identifying one or more sparse points of the multiple sparse points when each subset of image segments corresponding to the one or more sparse points is received and estimating a position of the device in the environment based on the identified the one or more sparse points.

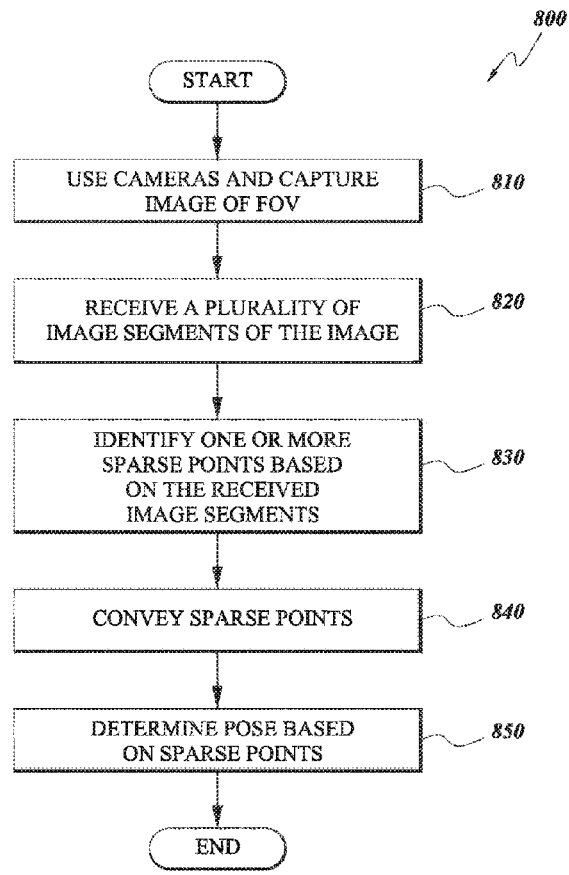

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5, 6 and 18 are cancelled.

Claims 1 and 9 are determined to be patentable as amended.

Claims 2-4, 7-8, 10-17 and 19-20, dependent on an amended claim, are determined to be patentable.

New claims 21-30 are added and determined to be patentable.

1. An imaging system comprising:
   an image capture device comprising a lens and an image sensor, the lens configured to direct light from an environment surrounding the image capture device to the image sensor, the image sensor configured to:
      sequentially capture a first plurality of image segments of an image based on the light from the environment, the image representing a field of view (FOV) of the image capture device, the FOV comprising a portion of the environment and including a plurality of sparse points, and
      sequentially capture a second plurality of image segments, the second plurality of image segments captured after the first plurality of image segments and forming at least another portion of the image;
   non-transitory data storage configured to sequentially receive the first and second plurality of image segments from the image sensor and store instructions for estimating at least one of a position and orientation of the image capture device within the environment; and at least one hardware processor operably coupled to the non-transitory data storage and configured by the instructions to:
      identify a first group of sparse points based in part on a corresponding subset of the first plurality of image segments, the first group of sparse points identified as the first plurality of image segments are received at the non-transitory data storage,
      determine at least one of the position and orientation of the [imaging] *image capture* device within the environment based on the first group of sparse points,
      identify a second group of sparse points based in part on a corresponding subset of the second plurality of image segments, the second group of sparse points identified as the second plurality of image segments are received at the non-transitory data storage, and
      update the at least one of the position and orientation of the [imaging] *image capture* device within the environment based on [the first and second group] *a sliding set* of sparse points *comprising sparse points selected from the second group of sparse points and from the first group of sparse points,*
      *wherein the hardware processor is configured to update the at least one of the position and orientation of the image capture device based on the sliding set of sparse points that comprises a predetermined number of sparse points greater than a number of sparse points in the second group of sparse points, and wherein the sliding set of sparse points includes all of the sparse points from the second group of sparse points and a remainder of the predetermined number of sparse points from the first group of sparse points.*

9. A head mounted display (HMD) configured to be worn on the head of a user, the HMD comprising:
   a frame;
   a display supported by the frame and disposed forward of an eye of the user;
   an outward facing image capture device disposed on the frame and comprising a lens and an image sensor, the lens configured to direct light from an environment surrounding the HMD to the image sensor and the image sensor configured to sequentially capture a plurality of image segments of an image based on the light from the environment, the image representing a field of view (FOV) of the outward facing image capture device, the FOV comprising a portion of an environment and including a plurality of sparse points, wherein each sparse point is identifiable in part based on a corresponding subset of the plurality of image segments;
   non-transitory data storage configured to sequentially receive the plurality of image segments from the image sensor and store instructions for estimating at least one of a position and orientation of the HMD within the environment; and
   at least one hardware processor operably coupled to the non-transitory data storage and configured by the instructions to:
      sequentially identify one or more sparse points of the plurality of sparse points when each subset of image segments corresponding to the one or more sparse points is received at the non-transitory data storage, and
      estimate the at least one of the position and orientation of the HMD within the environment based on *a sliding set comprising a predetermined number of most recently identified sparse points selected from* the identified [the] one or more sparse points, *and excluding sparse points that are not within the predetermined number of most recently identified sparse points,*
      *wherein each individual estimation is based on a different set of sparse points relative to a set of sparse points used for a preceding estimation.*

21. *The imaging system of claim 1 wherein the image sensor is further configured to sequentially capture a third plurality of image segments captured after the second plurality of image segments and forming at least a further portion of the image, and wherein the hardware processor is further configured to:*
    *identify a third group of sparse points based in part on a third plurality of image segments, and*
    *update the at least one of the position or orientation of the image capture device within the environment based at least in part on an updated sliding set of sparse points comprising at least the most recently identified sparse points selected first from the third group and from the second group.*

22. *The imaging system of claim 21, wherein the hardware processor is further configured to update the at least one of the position or orientation of the image capture device within the environment based at least in part on the updated* sliding set of sparse points comprising the predetermined number of most recently identified sparse points selected first from the third group, from the second group, and from the first group.

23. An imaging system comprising:
an image capture device comprising a lens and an image sensor, the lens configured to direct light from an environment surrounding the image capture device to the image sensor, the image sensor configured to:
sequentially capture a first plurality of image segments of an image based on the light from the environment, the image representing a field of view (FOV) of the image capture device, the FOV comprising a portion of the environment and including a plurality of sparse points, and
sequentially capture a second plurality of image segments, the second plurality of image segments captured after the first plurality of image segments and forming at least another portion of the image;
non-transitory data storage configured to sequentially receive the first and second plurality of image segments from the image sensor and store instructions for estimating at least one of a position and orientation of the image capture device within the environment; and at least one hardware processor operably coupled to the non-transitory data storage and configured by the instructions to:
identify a first group of sparse points based in part on a corresponding subset of the first plurality of image segments, the first group of sparse points identified as the first plurality of image segments are received at the non-transitory data storage,
determine at least one of the position and orientation of the image capture device within the environment based on the first group of sparse points,
identify a second group of sparse points based in part on a corresponding subset of the second plurality of image segments, the second group of sparse points identified as the second plurality of image segments are received at the non-transitory data storage, and
update the at least one of the position and orientation of the image capture device within the environment based on a sliding set of sparse points comprising sparse points selected from the second group of sparse points and from the first group of sparse points,
wherein the hardware processor is configured to update the at least one of the position and orientation of the image capture device based on the sliding set of sparse points that comprises a predetermined number of sparse points greater than a number of sparse points in the second group of sparse points, and wherein the sliding set of sparse points includes all of the sparse points from the second group of sparse points and a remainder of the predetermined number of sparse points from the first group of sparse points,
wherein the image sensor is further configured to sequentially capture a third plurality of image segments captured after the second plurality of image segments and forming at least a further portion of the image, and
wherein the hardware processor is further configured to:
identify a third group of sparse points based in part on a third plurality of image segments, and
update the at least one of the position or orientation of the image capture device within the environment based at least in part on an updated sliding set of sparse points comprising at least the most recently identified sparse points selected first from the third group and from the second group,
wherein the updated sliding set of sparse points is formed with a predetermined number of sparse points that is greater than a number of sparse points in the third group such that the hardware processor is further configured to update the at least one of the position or orientation of the image capture device within the environment based at least in part on the updated sliding set of sparse points comprising all of the sparse points from the third group, at least a portion of the sparse points of the second group, and if the third group of sparse points and the second groups of sparse points collectively number less than the predetermined number of sparse points in the sliding set of sparse points, from at least a portion of the sparse points of the first group.

24. The imaging system of claim 1, wherein the hardware processor configured to update the at least one of the position and orientation of the image capture device according to a sliding integration method with the sliding set of sparse points.

25. The imaging system of claim 1, wherein the hardware processor configured to exclude sparse points that are not within the predetermined number of most recently identified sparse points when updating the at least one of the position and orientation of the image capture device.

26. The imaging system of claim 1, wherein the sliding set of sparse points is a rolling set of sparse points.

27. The HMD of claim 9,
wherein the image sensor is configured to, when capturing the portion of the environment including the plurality of sparse points: sequentially capture a first plurality of image segments and sequentially capture a second plurality of image segments, the second plurality of image segments captured after the first plurality of image segments;
wherein the at least one hardware processor is further configured to, when sequentially identifying the one or more sparse points, identify a first group of the sparse points based in part on a corresponding subset of the first plurality of image segments and identify a second group of sparse points based in part on a corresponding subset of the second plurality of image segments; and
wherein the at least one hardware processor is further configured to, when estimating the at least one of the position and orientation of the HMD within the environment, estimate the at least one of the position and orientation of the HMD within the environment based on the sliding set that comprises sparse points selected from the second group of sparse points and from the first group of sparse points.

28. The HMD of claim 27, wherein the hardware processor is configured to update the at least one of the position and orientation of the image capture device based on the sliding set of sparse points that comprises a predetermined number of sparse points greater than a number of sparse points in the second group of sparse points, and wherein the sliding set of sparse points includes all of the sparse points from the second group of sparse points and a remainder of the predetermined number of sparse points from the first group of sparse points.

29. The HMD of claim 27,
wherein the image sensor is further configured to sequentially capture a third plurality of image segments captured after the second plurality of image segments and forming at least a further portion of the image, and wherein the hardware processor is further configured to:
identify a third group of sparse points based in part on a third plurality of image segments, and
wherein the at least one hardware processor is further configured to, when estimating the at least one of the position and orientation of the HMD within the environment, estimate the at least one of the position and orientation of the HMD within the environment based on the sliding set that comprises a predetermined number of the sparse points such that the hardware processor is further configured to estimate the at least one of the position or orientation of the HMD within the environment based at least in part on the sliding set of sparse points comprising all of the sparse points from the third group, at least a portion of the sparse points of the second group, and if the third group of sparse points and the second groups of sparse points collectively number less than the predetermined number of sparse points in the sliding set of sparse points, from at least a portion of the sparse points of the first group.

30. The HMD of claim 9, wherein the hardware processor configured to update the at least one of the position and orientation of the HMD according to a sliding integration method with the sliding set of sparse points.

\* \* \* \* \*